United States Patent [19]
Kimura et al.

[11] Patent Number: 4,855,840
[45] Date of Patent: Aug. 8, 1989

[54] CONTROL CIRCUIT FOR VIDEO PRINTER

[75] Inventors: Hiroyuki Kimura, Kanagawa; Yasunori Kobori, Yokohama; Kentaro Hamma, Yokohama; Takashi Omata, Yokohama; Katsunori Oki, Katsuta, all of Japan

[73] Assignee: Hitachi, Ltd., Tokyo, Japan

[21] Appl. No.: 193,787

[22] Filed: May 13, 1988

[30] Foreign Application Priority Data

May 15, 1987 [JP] Japan ................................ 62-116814

[51] Int. Cl.$^4$ ........................ G01D 15/10; H04N 1/21
[52] U.S. Cl. ................................. 358/296; 346/76 PH
[58] Field of Search .................. 346/76 PH; 400/120; 358/296, 298, 300, 302

[56] References Cited
U.S. PATENT DOCUMENTS 4,443,121 4/1984 Arai ................................ 346/76 PH
4,524,367 6/1985 Horiya ........................... 346/76 PH

FOREIGN PATENT DOCUMENTS 55-69482 5/1980 Japan .
61-135768 6/1986 Japan .

Primary Examiner—E. A. Goldberg
Assistant Examiner—Mark Reinhart
Attorney, Agent, or Firm—Antonelli, Terry & Wands

[57] ABSTRACT

In a video printer, a suffer memory for memorizing picture data corresponding to one line includes a memory addressed by a first address and a second address. And the video printer includes a memory write circuit having a first address generation circuit for generating a first address depending upon gradation of picture data on the basis of inputted picture data and for supplying said first address to the memory and a second address generation circuit for generating an address signal depending upon the number of printing dots of the thermal head and for supplying said address signal to the memory. The video printer also includes a memory read circuit for successively generating the second address for each of the first address and supplying the second address to the memory.

5 Claims, 23 Drawing Sheets

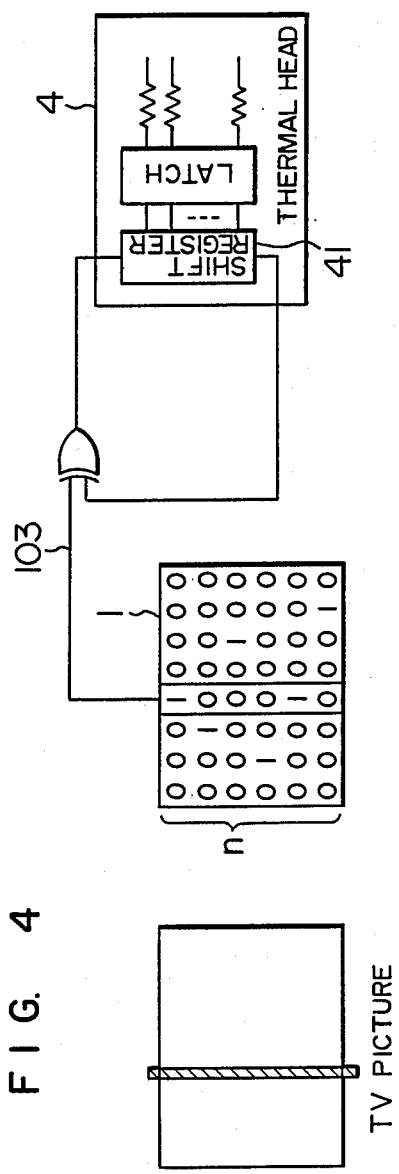
F I G. 4
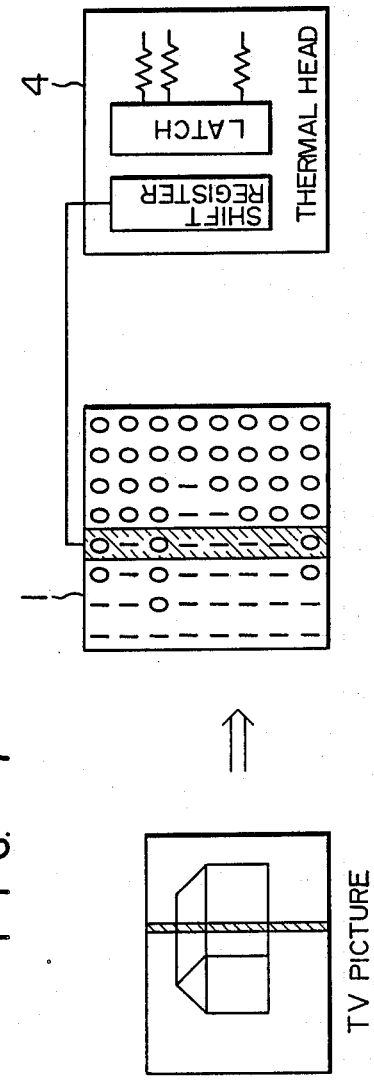
F I G. 7

CONTROL CIRCUIT FOR VIDEO PRINTER

BACKGROUND OF THE INVENTION

The present invention relates to a video printer for printing video signals, and in particular to a control circuit for thermal printer.

In a printer of the prior art as described in JP-A-61-135768, data of one line are held once in a line buffer and then transferred to a shift register having bits respectively connected to heating elements of a thermal head via latches, flip-flops and switches, thus printing being performed. In case gradation recording is performed by using a printer of the prior art, graded data are stored beforehand in a ROM to control the conduction time of the thermal head as described in JP-A-55-69482.

If graded recording is attempted by using a printer of the prior art, comparison means must be provided for each dot of the thermal head as described in JP-A-55-69482, resulting in a problem of increased circuit size.

If gradation data are stored in a line buffer in order to prevent the increase in circuit size and the output of the line buffer is compared with the output of the gradation counter to write the comparison output into a shift register, there is a fear that data write time into the shift register might hinder the high speed printing.

SUMMARY OF THE INVENTION

An object of the present invention is to provide a video printer capable of high speed printing while restraining the increase in circuit size to the minimum.

In a video printer of the present invention, a buffer memory for memorizing picture data corresponding to one line comprises a memory addressed by a first address and a second address. (In the following description, one line comprises n dots.) The video printer includes a memory write circuit having first address generation means for generating a first address depending upon the gradation of the picture data on the basis of inputted picture data and second address generation means for generating an address signal depending upon the number of printing dots of the thermal head and for supplying the address signal to the memory as the second address. (It is now assumed that the picture data has m gradations at most.) The video printer also includes a memory read circuit for successively generating the second address for each of the first address and for supplying the second address to the memory.

When data are to be written into the memory, the second address generation means supplies the second address corresponding to the first dot of the head to the memory. And the first address generation means supplies the first address depending upon the signal level (gradation) of the inputted picture signal to the memory. In a two-dimensional address space having a size of (n×m) defined by the first address and the second address, a datum "0" or "1" is recorded. The second address is successively changed from 1 to n. For the second address, the first address depending upon the signal level (gradation) of the inputted picture signal is generated to successively record data 0's or 1's. In the two dimensional space defined by the first address and the second address, gradation data 0's or 1's are thus recorded.

When data are to be read out from the memory, the memory readout means first outputs an address corresponding to the 1st gradation as the first address and subsequently outputs the second address corresponding to the first to the n-th dots of the head. From the two dimensional address defined by the first address and the second address of the memory, data are read out. The data thus read out are successively outputted to the shift register to let flow a current through the head for a conduction time corresponding to the first gradation. The first address is then increased by one and the data of the 2nd gradation is read out from the memory in the same way. The first address is successively increased up to the m-th gradation. The data up to the m-th gradation are read out from the memory, and printing of one line is completed.

When one line has been printed, the memory is cleared once. The next line signal is written into the memory. The next line is printed by the similar operation.

BRIEF DESCRIPTION OF THE DRAWINGS

FIGS. 4 and 5 are circuit diagrams showing embodiments of the present invention.

FIG. 7 is a diagram used for explaining the printing operation.

DESCRIPTION OF THE PREFERRED EMBODIMENTS

Figure 1:
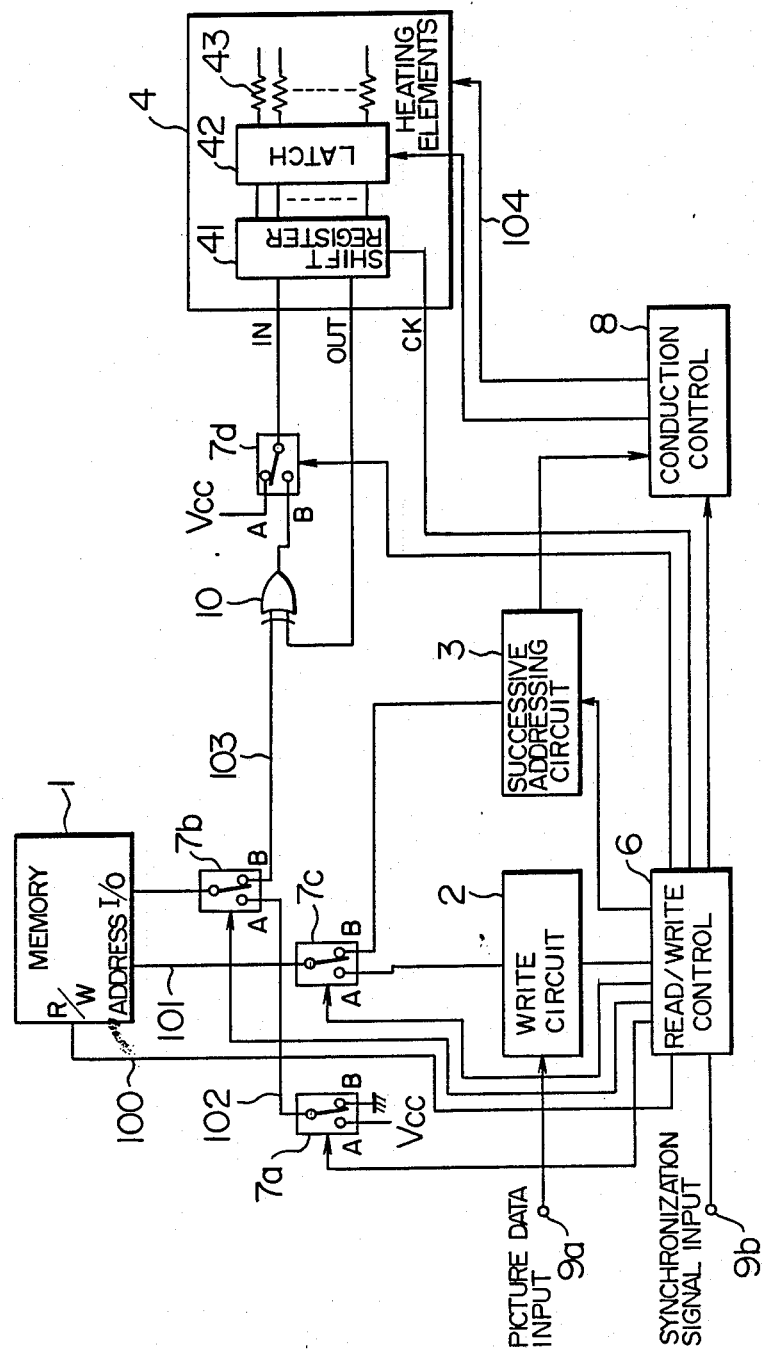
FIG. 1 is a circuit diagram showing an embodiment of the present invention.
Figure 2:
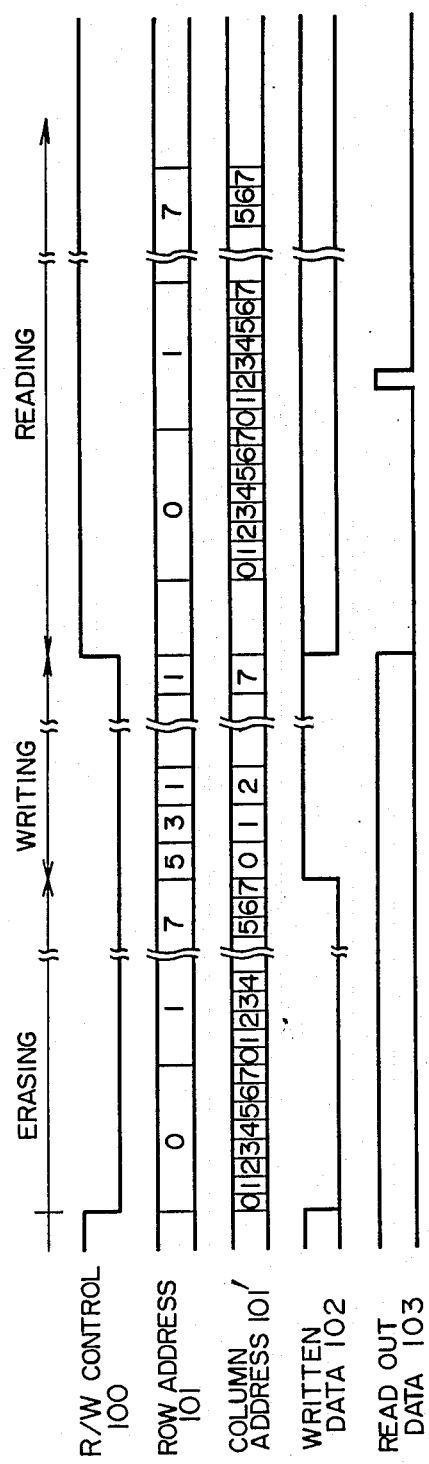
FIG. 2 is an operation timing chart of the circuit shown in FIG. 1.
Figure 3:
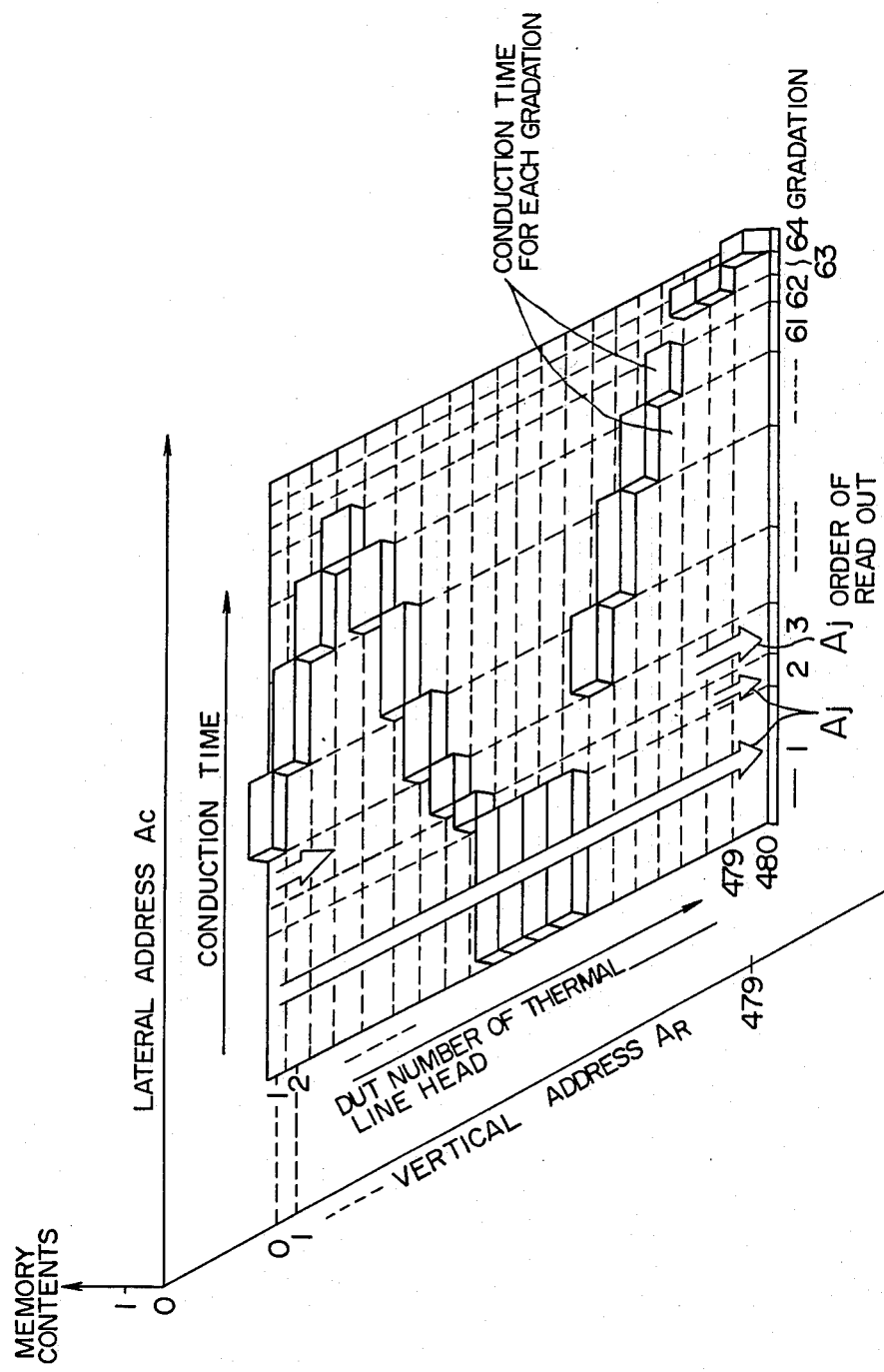
FIG. 3 is a schematic diagram of data recorded in a line memory.

An embodiment of the present invention will now be described by referring to FIG. 1. In FIG. 1, numeral 1 denotes a memory for storing conduction data, 2 a write circuit, 3 a successive addressing circuit, 4 a thermal head including a shift register, 5 a latch and heating elements, 6 a control circuit for controlling the write/read operation, 7a a switch for setting a datum to be written into the memory 1 to "1" or "0", 7b a switch for deciding whether data should be written into the memory 1 or data should be read out therefrom, 7c an address changeover switch for selecting either a write address or a read address, 7d a switch for selecting either a datum read out from the memory 1 or a fixed datum "1" as the datum to be sent to the thermal head, 8 a conduction control circuit for controlling the conduction of the thermal head 4, 9a a picture data input terminal, and 9b a synchronization signal input terminal. FIG. 2 shows a timing chart of the circuit illustrated in FIG. 1. FIG. 3 shows data contents in the memory.

FIG. 4 shows how picture data are taken into the memory 1 and are thereafter printed.

The operation will now be described by referring to drawings.

As shown in FIG. 3, the line memory 1 is addressed by a lateral address $A_C$ and a vertical address $A_R$. The operation will now be described by referring to a case where the thermal head 4 has 480 dots and pictures are printed in 64 gradations. As the longitudinal address $A_R$, 480 addresses ranging from 0 to 479 are assigned, and each of 480 addresses corresponds to each dot of the thermal head 4. As the lateral address $A_C$, 64 addresses ranging from 0 to 63 are assigned.

In the line memory 1, "1" is written to an address corresponding to the printing gradation at each dot. FIG. 3 shows memory contents of the line memory 1 in a two-dimensional way.

The operation for writing/reading data into/from this line memory 1 will now be described.

A video printer is used for printing R, G and B signals of a television picture by using ink of Cy, Mg and Ye to produce a color print. In fact, signals of one row of a TV picture in the vertical direction as shown in FIG. 4 undergo A/D conversion and then are taken into the memory 1. The signals thus taken into the memory 1 are sent to a thermal head 4 including a shift register 41 and heating elements 43. Heat is thus generated for a time corresponding to each input gradation level to vary the amount of ink, the picture being thus printed. Its concrete circuit is shown in FIG. 1. First of all, the switches 7a, 7b and 7c are thrown respectively to positions B, A and A to write data "0" into all areas of the memory 1. This is performed by controlling the switches 7 under the control of the read/write control circuit 6 and successively changing the addresses ($A_R$, $A_C$) in the write circuit 2. The A/D converted picture data 9a are then inputted to the write circuit 2. At this time, all of the switches 7a, 7b and 7c are thrown to positions A. The vertical address $A_R$ ranging from 0 to 479 is successively supplied from the write circuit 2 to an address input terminal of the memory 1 as the row address. In synchronism with the supply of the longitudinal address $A_R$, picture data corresponding to each dot of the thermal head 4 is taken from the picture data input terminal 9a into the write circuit 2 and converted into the lateral address $A_C$ to be supplied to the memory 1 as the column address. Voltage $V_{cc}$ is supplied to an I/O terminal of the memory 1 via the switch 7a. A logical "1" is thus written to an address of the memory 1 defined by the vertical address $A_R$ and the lateral address $A_C$.

The vertical address $A_R$ is successively increased. A logical "1" is written to an address corresponding to the gradation level of the picture data corresponding to each dot. When the vertical address $A_R$ has reached 479, the operation of taking in the picture data corresponding to one line is completed.

The state of the memory 1 when the operation of taking into the picture data has been completed is shown in FIG. 3. As shown in FIG. 3, only data corresponding to the gradation of each dot are 1's, and other data are 0's.

In printing, switches 7b, 7c and 7d are switched to positions B, B and A, respectively. And clocks are supplied from the read/write control circuit 6 to the shift register 41 within the thermal head 4. The length of the shift register within the thermal head 4 is equal to the vertical bit length (480) of the memory 1. When clocks and a datum "1" have been supplied, the read/write control circuit 6 changes over the switch 7d to the position B to start controlling the print data. For every lateral address $A_C$, the successive addressing circuit 3 successively generates the vertical address $A_R$ and supplies it to the address input terminal of the memory 1. For each gradation, data of each dot stored in the memory 1 are outputted at the I/O terminal of the memory 1. Data are read out from the memory 1 in an order indicated by arrows Aj of FIG. 3 and are taken into the shift register 41 via an exclusive-OR circuit 10. First of all, data of the 0-th gradation in the vertical direction of the memory 1 are successively read out by the successive addressing circuit 3. The data thus read out undergoes exclusive-OR operation together with the output of the shift register included in the thermal head 4, and the resultant exclusive-OR output is returned to the thermal head again. If "1" exists in the data contained in the memory 1, the exclusive-OR output becomes "0". When data of one row in the vertical direction have been transmitted, data of the shift register 41 corresponding to positions where "1" are written in the vertical direction of the memory become "0". The conduction control circuit 8 temporarily transfers these data to the latch circuit 42, and makes heating elements conductive by using a control signal 104 on the basis of outputs of this latch circuit 42. As a result, heat is generated only at positions where "1" are written in one vertical row of the memory 1 to attach ink corresponding to the 0-th gradation onto paper. Data of the 1st, 2nd, ..., and the 63rd gradation are successively read out from the memory 1 in the vertical direction and exclusive-ORed with the output of the shift register 41 included in the thermal head 4 to control the amount of heat generation for each dot of the thermal head 4 by using the gradation level. FIG. 2 shows this operation in the form of a timing chart. In the operation of the memory 1, the erasing, writing and reading operation constitutes one cycle. First of all, all of the vertical and lateral addresses of the memory 1 are specified by the write circuit 2, and data 0's are written into them. As for the A/D-converted picture data, data 1's are successively written into lateral addresses $A_C$ corresponding to respective A/D conversion levels.

When the writing operation has been completed, data of one row in the vertical direction are read out by the successive addressing circuit 3 and are sent to the thermal head.

In the present embodiment, data writing operation is performed by using the picture data as the lateral address of the memory 1. Therefore, data of one dot can be written by a single writing operation, the speed of writing data into the line memory 1 being increased.

Figure 5:
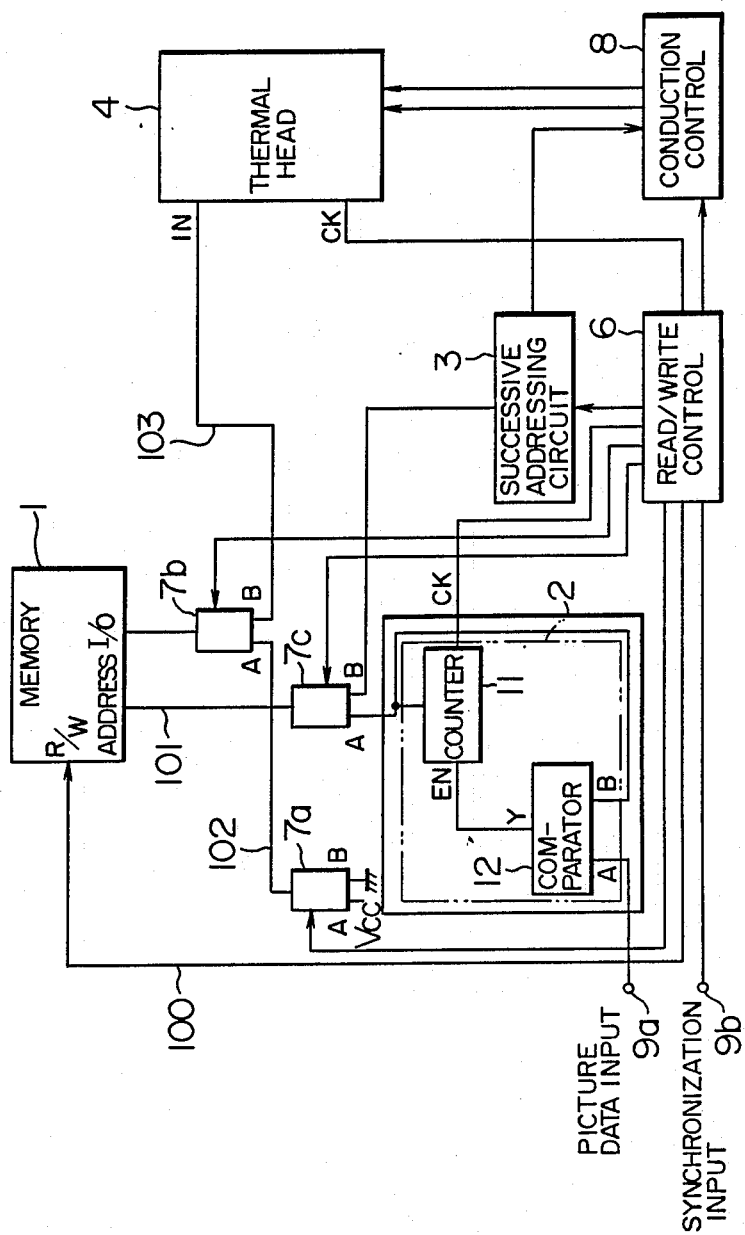

FIG. 5 shows another embodiment of the present invention. In FIG. 5, the same symbols as those of FIG. 1 denote identical functions. The write circuit 2 includes a counter 11 and a comparator 12 for comparing the output of the counter with input data.

Figure 6:
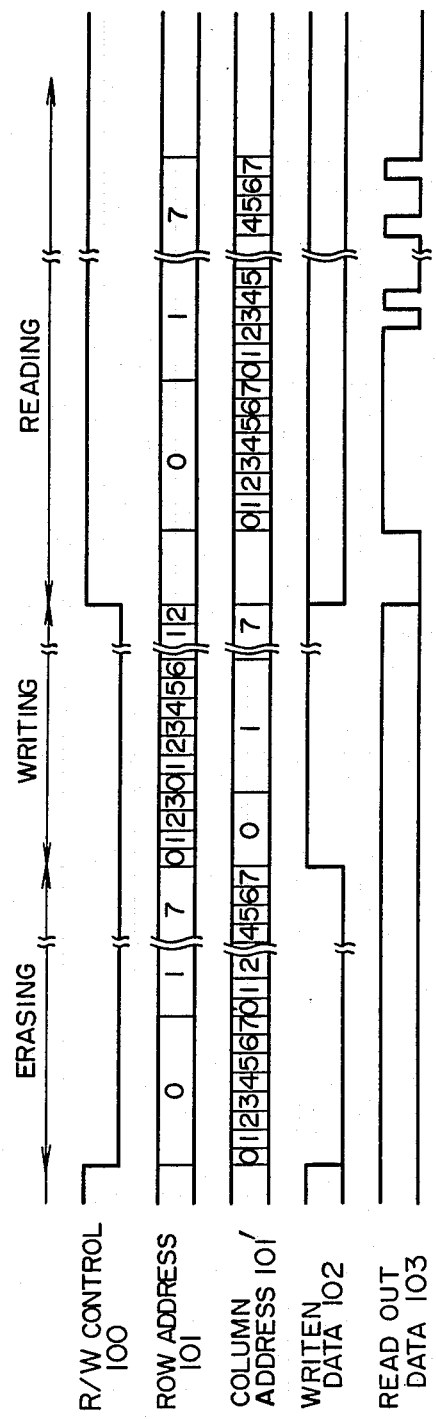
FIG. 6 is an operation timing chart of the circuit shown in FIG. 5.

FIG. 6 is a timing chart showing the operation of the circuit illustrated in FIG. 5. FIG. 7 shows how picture data are printed after they have been transferred to the memory 1. The operation of the circuit shown in FIG. 5 will now be described by referring to drawings.

Figure 8:
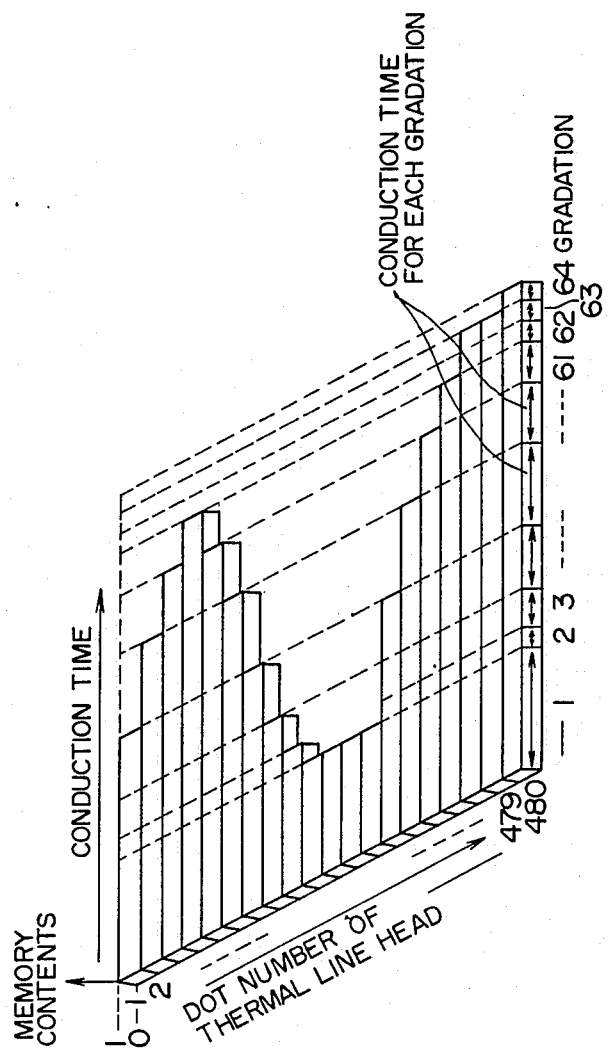
FIG. 8 is a schematic diagram of data recorded in a line memory.

In the present embodiment, the exclusive OR circuit for the read out data and the thermal head 4 is made unnecessary by directly writing the conduction ON-OFF data into the memory 1. In the preceding embodiment, therefore, only conduction ON-OFF transition points are recorded as memory contents as shown in FIG. 3. In the present embodiment, however, the conduction ON-OFF data as they are written into the memory 1 as shown in FIGS. 7 and 8. In printing, data read out for each gradation are directly transferred to the thermal head 4.

The actual operation is shown in FIG. 7. First of all, data "0" are written into the memory 1. Succeedingly, input data are written by the write circuit 2. If a datum "4", for example, is inputted, the counter 11 counts in the order of 0, 1, 2 and 3. On the other hand, the comparator 12 compares the input datum "4" with the count of the counter 11. Upon coincidence, the comparator 12 stops the counting operation of the counter 11 and ceases the writing concurrently therewith. Conduction data are thus successively written into the memory 1.

In printing, data of one row in the vertical direction for each gradation are successively read out from the successive addressing circuit 3 and are sent to the thermal head 4 in the same way as the above described embodiment. In this case, the conduction pattern is written into the memory 1 beforehand. Unlike the above described embodiment, therefore, it is unnecessary to perform the exclusive OR operation for the serial output read out from the memory 1, and it is also unnecessary to initially set the shift register 41 within the thermal head 4 to 1's. In the present embodiment, the write circuit 2 becomes complicated and the number of write circuits 2 is increased. However, the circuit configuration of the memory readout side becomes advantageously simple. In the present embodiment, the memory 1 is initially set to 0's and 1's are additionally written only during the conduction ON period. However, there is no problem in the opposite case. That is to say, there is no problem even if 1's are initially written into all locations and thereafter 0's are additionally written only during the conduction OFF period. In this case, the counter 11 may have a down counter structure. While successively counting down the address from the highest gradation (such as address &H3F in case of 6 bits), 0's are written, and the writing operation is ceased when the address has agreed with the input data.

Figure 9:
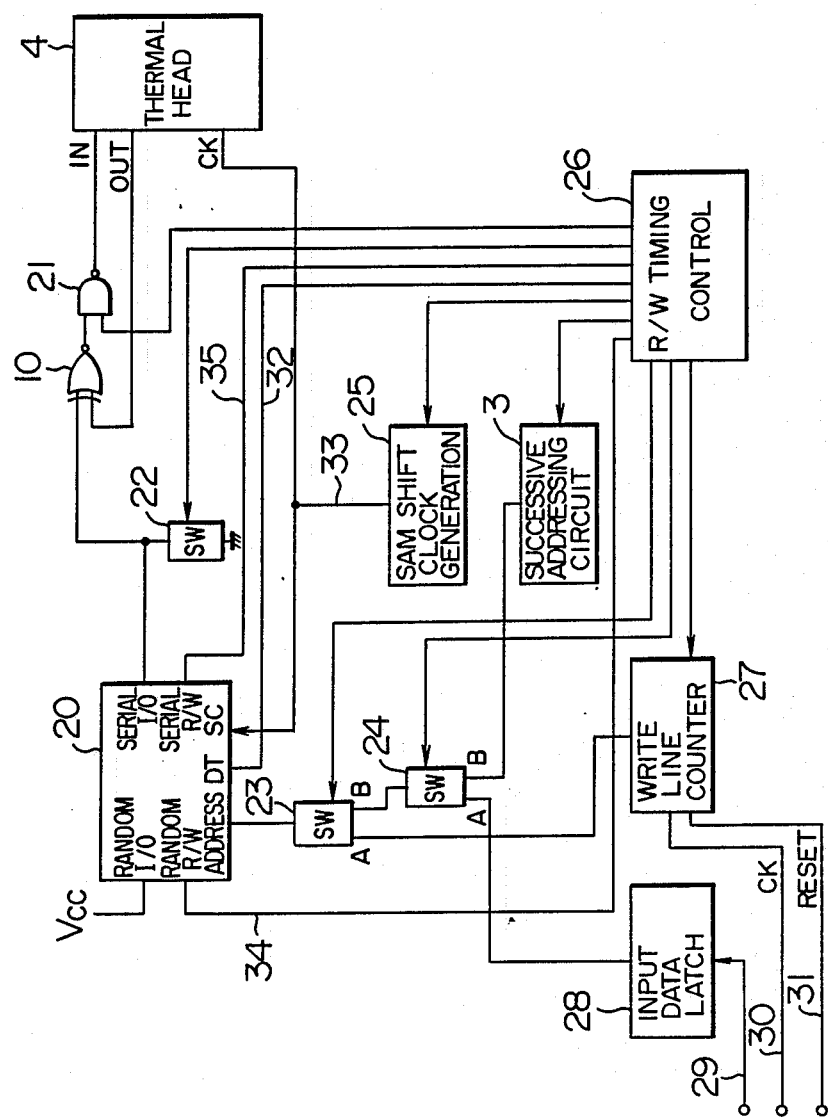
FIG. 9 is a circuit diagram showing another embodiment of the present invention.
Figure 10:
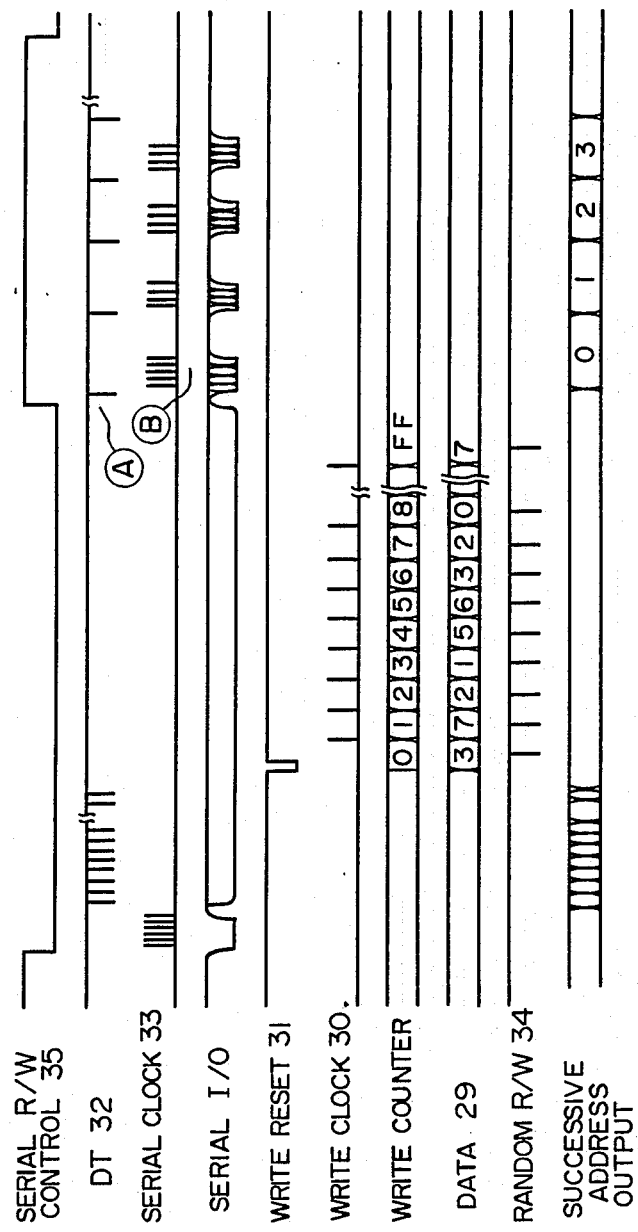
FIG. 10 is an operation timing chart of the circuit shown in FIG. 9.
Figure 11:
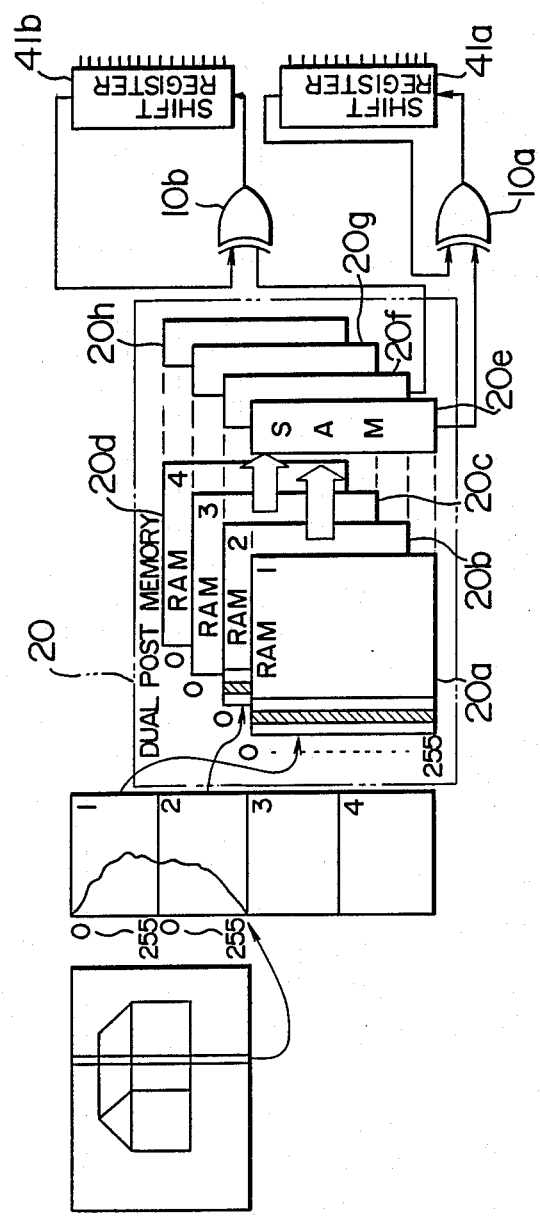
FIG. 11 is a diagram used for explaining the printing operation.

FIG. 9 shows another embodiment of the present invention. In the present embodiment, the same symbols as those of FIG. 1 denote identical functions. In FIG. 9, numeral 20 denotes a dual port memory having two input/output ports, i.e., a serial input/output port and a random input/output port, 21 a NAND circuit, 22 a switch connected to the serial port, 23 a switch for changing over between the row address and the column address, 24 a switch for changing over between the row address of the writing operation and that of the reading operation, 25 a generation circuit for generating clocks to read data from a serial access memory (hereafter abbreviated as SAM), 26 a timing control circuit for performing timing control of R/W, 27 a counter for deriving the column address in the writing operation, 28 a latch circuit for latching inputted picture data and for generating the row address for writing operation, 29 picture input data, 30 a write clock signal, 31 a reset signal for resetting the write line counter 27, 32 a control signal for transferring data from a random access memory section (hereafter referred to as RAM section) of the dual port memory 20 to the SAM section or vice versa, 33 an SAM readout clock signal, 34 an R/W control signal for the RAM section, and 35 a control signal for defining the data transfer direction in the SAM section and the RAM section. Further, FIG. 10 is a timing chart for showing the operation of the circuit illustrated in FIG. 9. FIG. 11 shows how picture data are printed via the dual port memory 20. The operation will now be described by referring to drawings.

In the present embodiment, the readout speed in the erasing and printing operation is raised by using a dual port memory 20 as a memory for storing data of on line. The dual port memory 20 has a memory (SAM) capable of undergoing serial access in addition to the random memory section (RAM). It is possible to transfer all data of a specific row of the RAM to the SAM at a time, read them from the SAM, and transfer the data contained in the SAM to a specific row of the RAM section.

In the present embodiment, a 64-kbit memory having four 16-kbit RAMs is used as the dual port memory 20. Each of RAMs 20a 20b, 20c and 20d has 256 bits in column address and has 64 bits in row address. In the description of foregoing embodiments, the vertical address of the memory 1 also has 480 bits in conformity with the number 480 of dots of the thermal head 4. In case the synchronization signal portion is also concurrently taken into the memory when an NTSC signal undergoes A/D conversion, for example, it is preferred to use a 512-bit memory.

In the present embodiment, two RAMs 20a and 20b of the dual port memory 20 are used in parallel as a RAM having a structure of 512×64. The RAM 20a and RAM 20b are connected to an SAM 20e and an SAM 20f, respectively. The SAM 20e and SAM 20f are 256-bit shift registers 41a and 41b, respectively. Among bits of each of the shift registers 41a and 41b, 240 bits are connected to heating resistors of the thermal head. In the present embodiment, RAMs 20c and 20d are not used. The operation of the print control section using this memory will now be described. The control line 35 of the serial port is first changed to "0", and the switch 22 is closed to keep the serial port input at "0". The serial clock 33 is inputted. At this time, the switch 22 is closed by the R/W timing control circuit 26, to thereby cause a serial input of the dual port memory 20 to become "0". Simultaneously, the input of the NAND gate circuit 21 is kept "0", and data 1's are inputted to the shift register 41 within the thermal head 4. Data 0's are inputted to the SAM sections 20e and 20f within the dual port memory 20. When data 0's have been written into the SAM sections 20e and 20f, the switch 24 is thrown to the position B. By using the transfer control signal 32 and the serial port R/W control signal 35 while successively selecting the row address in the successive addressing circuit 3, data 0's in the SAM are transferred to the RAM sections 20a and 20b. In this way, the RAM section can simply be erased by transferring the contents of the SAM as many times as the number of row addresses.

As described by referring to the embodiment of FIG. 1, a column address is defined by a write line counter 27 and a row address is defined from the picture data after completion of the transfer. And the row and column addresses are selected by the switch 23 to write in data 1's. At this time, the write line counter 27 successively generates column addresses ranging from 0 to 255. On the first count from 0 to 255, only the I/O port of the RAM 20a becomes "1". On the next count from 0 to 255, the I/O port of the RAM 20b becomes "1" and the I/O port of the RAM 20a becomes "0". By counting from 0 to 255 twice, data writing of one line is completed.

In printing, the switch 24 is thrown to the position B again. The row address is successively addressed in the order of 0, 1, 2 . . . by the successive addressing circuit 3. The switch 22 is opened, and the output of the serial port is supplied to the exclusive NOR gate 10. After the first row address has been selected, data of the first vertical row of the RAM are transferred by the transfer control signal 32 and the serial port R/W signal 35 (as represented by A in the timing chart). The SAM shift clock 33 is then generated to read out data of the SAM section. Initially 1's are written into the shift register 41 within the thermal head 4. As explained by referring to the above described embodiment, therefore, the ON-OFF data of the thermal head 4 can be obtained by applying exclusive NOR operation to the output read out from the memory and the shift register 41 in the thermal head 4 since then.

The row address for reading operation is successively counted up to read out the memory contents, printing being thus performed.

In accordance with the embodiment of the present invention as described above, the memory erasing and the data readout in printing become simple. And the data transfer of the RAM and SAM sections can be performed in one cycle time. Accordingly, the print data can be read out rapidly, and the print time can be shortened.

In the explanation of the present embodiment, the 512-dot thermal head 4 was controlled by using areas of the RAM 1 and RAM 2 of the dual port memory 20. If areas of RAM 1 to 4 are used, a 1,024-dot thermal head 4 can be controlled. By thus increasing the area of the RAM, a thermal head having a different number of heating elements can be driven.

An embodiment in which high gradation recording is performed by using the unused RAMs 20c and 20d of the dual port memory 20 shown in FIG. 11 will now be described by referring to FIG. 12.

In the present embodiment, a switch 135 and a decoder 36 are newly added as compared with the embodiment illustrated in FIG. 11. An embodiment of the present invention is shown in FIG. 12. In FIG. 12, numeral 20 denotes a line memory including a dual port memory, 10 an exclusive OR circuit and 4 a thermal head 4. Numeral 37 denotes an erase counter for generating an address used to erase contents of the line memory 20, 38 a column counter for generating a column address in the write operation, 39 an area counter for selecting the input/output number of the dual port memory, 40 a clock generation circuit for generating clocks to read out from the line memory 20 and to drive the shift register 41 within the thermal head 4 in the printing operation, 42 an A/D converter for converting an analog video signal to digital data, 43 a timing generation circuit for controlling the operation of these address generation circuit, A/D converter and line memory, 44 an intermediate gradation control circuit for performing conduction control of the thermal held 4 in the reading operation and controlling the amount of heat generation of the thermal head 4 so as to reproduce the gradation correctly, 36 a decoder for decoding the writing position of the line memory 20 by using the area counter or A/D converted data, 35 a switch for changing over operation, 45 a switch for controlling the number of gradation by changing over to a position B in n (say, 64 gradations) control and changing over to a position A in m (128 gradations) control, 46, 47, 48 and 49 switches respectively controlled by the timing generation circuit, 50 a video input, 51 an input VD signal, 52 an input HD signal, 53 area selection lines inputted to a decoder 36, 55 a head clock line, and 56 a changeover signal for the switch 135.

The operation of two modes having $n_1/2n_1$ (64/128) gradation will now be described by referring to drawings.

Figure 12:
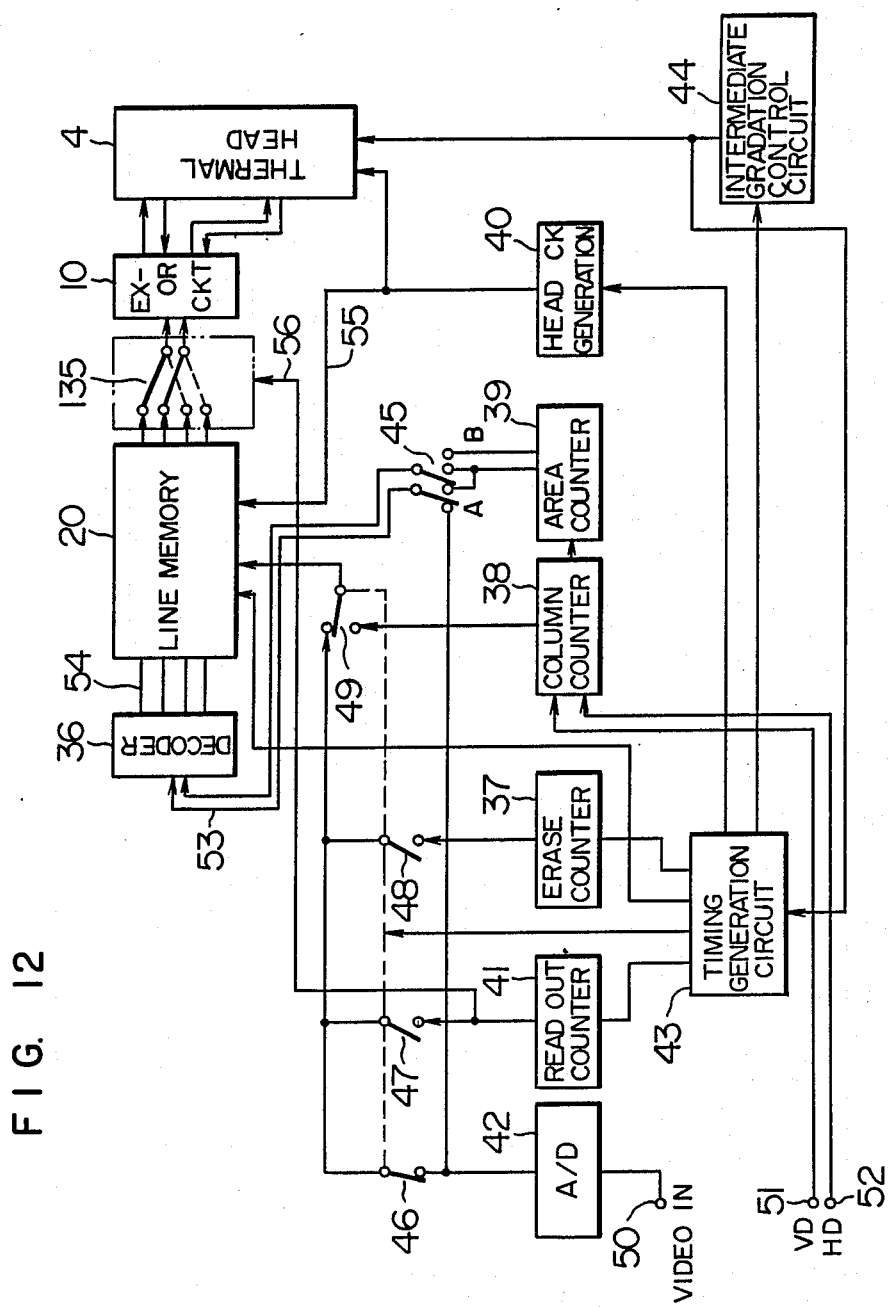
FIGS. 12, 13a, 13b, 14 and 15 are circuit diagrams showing other embodiments of the present invention.
Figure 13B:
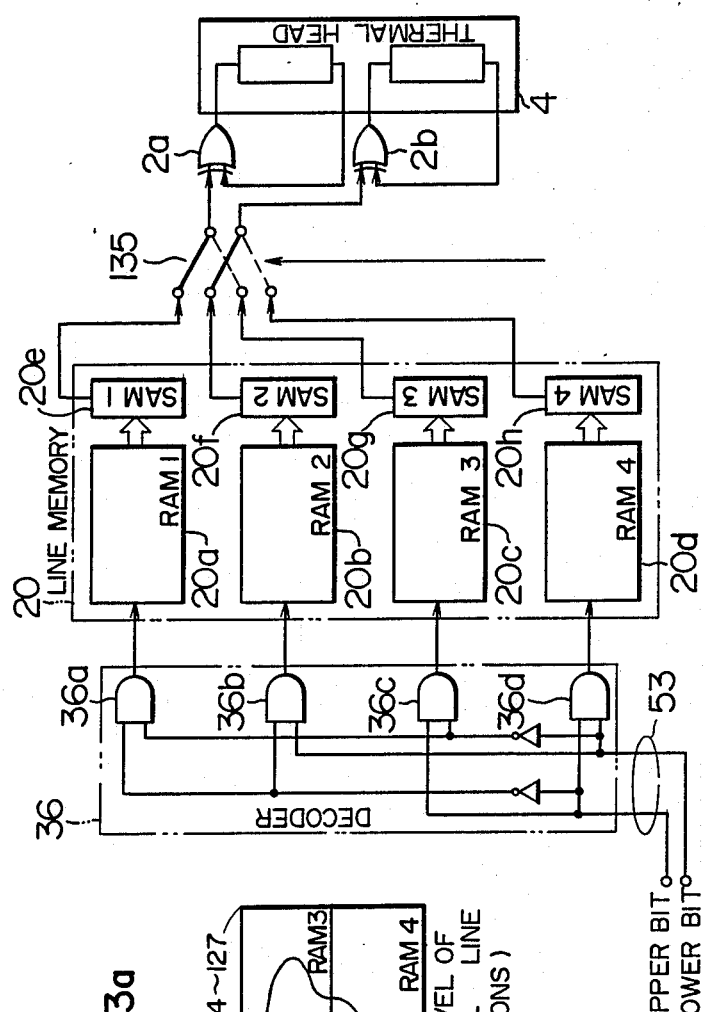
Figure 13A:
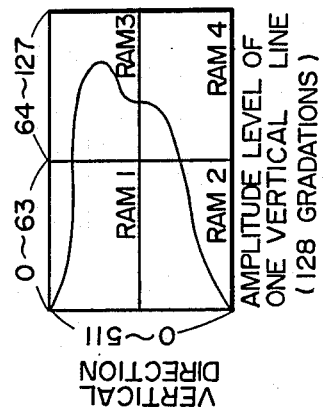

FIGS. 13a and 13b schematically show the operation of FIG. 12. Data of one vertical line of a video picture are taken into the circuit at the video input terminal 50 and converted into digital data by the A/D converter 42. The data thus converted into a digital form are successively written into the line memory 20. In this case, data are written in the same way as the embodiment of FIG. 11. At this time, the vertical direction of the line memory 20 is supplied data values obtained by applying A/D conversion to the lateral direction of the video picture in the order of the vertical direction thereof, and data 1's are written only where A/D converted values are present. Data 1's are successively written in the vertical direction. In printing, 1's are initially written into all locations of the shift register 41 within the thermal head 4. Data of one vertical row ranging from the 0-th gradation to the 63rd gradation are successively transferred to the SAM to undergo exclusive OR operation together with the output of the shift register 41 within the thermal head 4. The data transferred to the head are latched for each gradation. On the basis of these data, heating elements are driven to produce a print having the same density as that of the video picture.

In some cases, representation up to finer gradation is demanded for such a video printer. The changeover mode of 64/128 gradations will now be described. For 64 gradations, the switch 45 is thrown to the position B. Whenever the horizontal synchronization signal HD is inputted to the column counter 38, the column counter increases its count. The output of the column counter 38 corresponds to the vertical address of the line memory 20. Upon exceeding 256, the column counter 38 sends an output to the area counter 39. The area counter 39 outputs a signal for deciding which of RAMs 20a to 20d of the line memory 20 should be used. When the 64-gradation recording is performed, only the RAMs 20a and 20b are used. While the column counter 38 counts from 0 to 255, the area counter 39 outputs a signal +00", and only an AND gate 36a of the decoder 36 outputs "1". At the vertical address defined by the count of the column counter 38 of the RAM 20a and at the lateral address defined by the output of the A/D converter 42, 1's are successively written.

When the column counter 38 has counted 255, the output of the area counter 39 becomes "01". And the column counter 38 repeatedly counts from 0 to 255 again. Only an AND gate 36b of the decoder 36 changes to "1", and "1" is supplied to only the RAM 20b. The data are thus written into the RAM 20b.

In the readout operation, the readout counter 41 supplies the lateral address ranging from 0 to 63 to the line memory 20 as the lateral address, while the column counter 38 and the area counter 39 supply the vertical address to the line memory 20. The data stored in the memory 20 are thus read out, and one line is printed in the same way as the explanation of the embodiment of FIG. 11.

The 128-gradation recording will now be described. When data of one line are to be taken in the 128-gradation recording operation, the switch 45 is thrown to the position A.

The upper bit of the area selection line 53 is coupled to the MSB line among output signal lines of the A/D converter 42. The lower bit of the area selection line 53 is coupled to the lower bit of the area counter 39. The least significant bit of the A/D converter 42 which is not used in the 64-gradation recording operation is also used. The A/D converter 42 thus outputs a 7-bit digital signal. While the area counter outputs "00", i.e., while data of an area ranging from dot 0 to dot 255 is memorized, "0" is supplied to the lower bit of the decoder 36. One of input terminals of AND gates 36a and 36c is always supplied with "1". If at this time the gradation of the input video signal is low and the MSB output of the A/D converter 42 is "0", "0" is supplied to the upper bit input of the decoder 36. The AND gate 36a outputs "1", and data are written into the RAM 20a. If the gradation of the input video signal is high and the MSB output of the A/D converter 42 is "1", the AND gate 36c outputs "1" and data are written into the RAM 3. When a datum ranging from the 257th dot to the 511th dot is inputted, the area counter outputs "01". In accordance with the gradation of the input video signal, the datum is written into the RAM 2 and RAM 4.

In printing, the lateral addresses 0 to 127 are successively outputted by the readout counter 41. When data ranging from gradation 0 to 63 are read out, the SAM1 (20e) and the SAM2 (20f) are respectively connected to exclusive OR circuits 2a and 2b by the switch 135. When data ranging from gradation 64 to 127 are read out, the SAM3 (20g) and the SAM4 (20h) are respectively connected to the enclusive-OR circuits 2a and 2b by the switch 135. The switch 135 is controlled by the most significant bit of the readout counter 41.

A drive system of the thermal head 4 of a video printer whereto the present invention is applied will now be described. In case of dyes having nonlinear characteristics between the conduction time and the color generation density such as sublimated dyes, the conduction time differs from gradation to gradation. Depending upon the relation between the data transfer time and the conduction time, therefore, a pause time is caused in the conduction time of one dot, resulting in a lowered heat generation efficiency. In addition, there is a fear that it becomes very difficult to design the conduction time of each gradation. Therefore, a video printer according to the present invention includes a data count circuit, a latch signal generation circuit, a gradation count circuit, strobe generation means and a latch signal generation circuit in the thermal head drive circuit.

The present embodiment will now be described by referring to FIG. 14.

Figure 14:
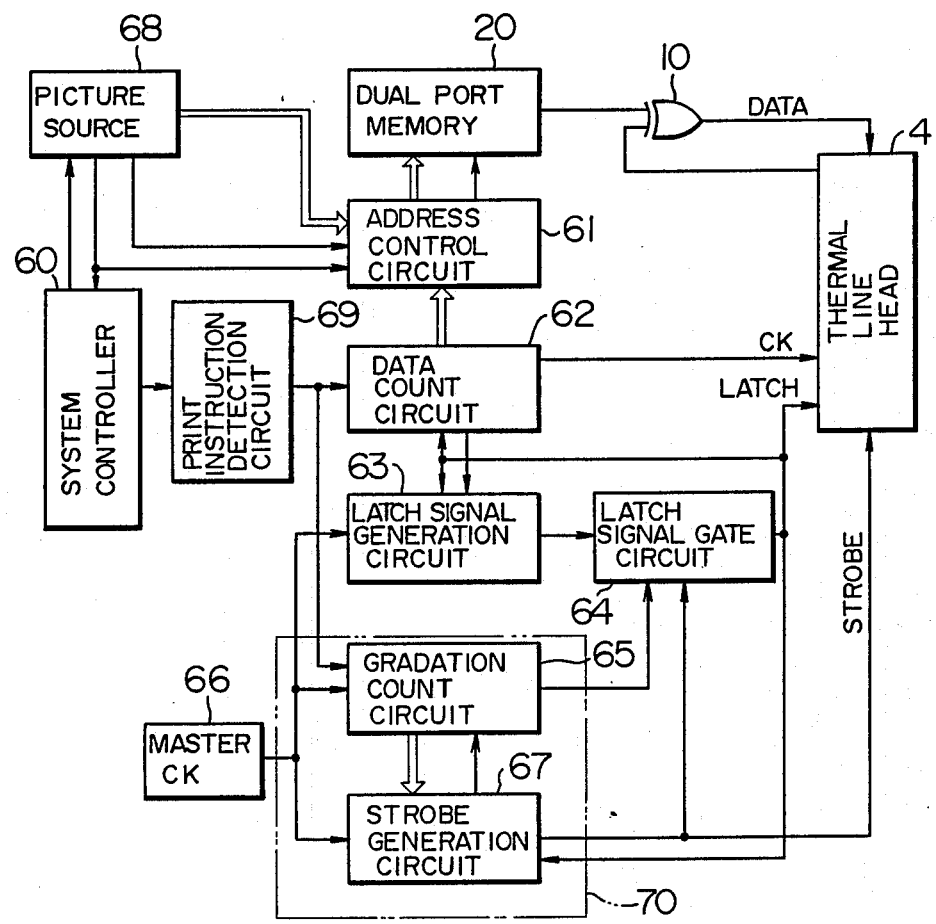

In FIG. 14, numeral 60 denotes a system controller, 20 a dual port memory, 61 an address control circuit, 69 a print instruction detection circuit, 62 a data count circuit, 63 a latch signal generation circuit, 64 a latch signal gate circuit, 66 a master CK generation circuit, 65 a gradation count circuit, 67 a strobe generation circuit, 10 an exclusive OR circuit, 4 a thermal line head.

The operation of the circuit shown in FIG. 14 will now be described.

The picture source 68 stores digital data corresponding to one screen.

The picture source 68 sends digital picture data corresponding to one line of the screen and a control signal synchronized to the digital picture data to the address control circuit 61. The address control circuit 61 sends the picture data supplied from the picture source 68 to the dual port memory 20 as the address. Data of one line are converted into ON/OFF signals of the thermal head 4 and stored in the dual port memory 20. The data stored in the dual port memory 20 are the same as those shown in FIG. 3.

After the head ON/OFF data of one line are stored in the dual port memory 20, the system controller 60 sends a print instruction to the print instruction detection circuit 69. The print instruction detection circuit 69 sends the print instruction detection signal to the data count circuit 62 and the gradation count circuit 65.

The data count circuit 62 sends the transfer clock CK to the thermal line head 4, and simultaneously supplies the address to the dual part memory 20 via the address control circuit 61. The data count circuit 62 reads out data of one line of the 0-th gradation stored in the dual port memory 20 and sends the data to the thermal head 4 via the exclusive OR 10.

When the data count circuit 62 has transferred the head ON/OFF data of one line of the 0-th gradation to the thermal head 4, the data count circuit 62 sends a data transfer completion signal to the latch signal generation circuit 63.

Upon receiving the data transfer completion signal, the latch signal generation circuit 63 sends a latch source pulse to the latch signal gate circuit 64.

The latch signal gate circuit 64 sends a latch signal to the thermal head 4, the latch signal generation circuit 63, the strobe generation circuit 67 and the data count circuit 62.

In the thermal head 4, a shift register for inputting the head ON/OFF data and a latch for holding the head ON/OFF data of the shift register during the conduction of heating elements are provided. By the latch signal supplied from the latch signal gate circuit 64, head ON/OFF data are transferred to the latch within the thermal line head 4.

The strobe generation circuit 67 is supplied with the latch signal and sends a strobe pulse to the thermal line head 4 and the latch signal gate circuit 64.

The thermal head 4 receives the strobe pulse and performs conduction for the 0-th gradation.

In the same way as the data transfer operation of the 0-th gradation, the data count circuit 62 transfers the data of the 1st gradation to the thermal line head 4.

When the data transfer of the 1st gradation has been completed, the data count circuit 62 sends the data transfer completion signal to the latch signal generation circuit 63. The latch signal generation circuit 63 sends a latch source pulse to the latch signal gate circuit 64 again.

The latch signal gate circuit 64 is supplied with a strobe pulse from the strobe generation circuit 67 and a signal transmitted during a one-line print period from the gradation count circuit 65. Even if the data transfer is completed while the strobe pulse is being outputted and the latch source pulse is outputted by the latch signal generation circuit 63, the latch signal is not outputted because of gating performed by the latch signal gate circuit 64.

When the strobe pulse output of the 0-th gradation has been finished, the latch signal gate circuit 64 opens the gate and sends a latch pulse to the thermal head 4, the strobe generation circuit 67, the latch signal generation circuit 63, and the data count circuit 62. This time, transfer data of the 2nd gradation and the strobe pulse of the 1st gradation are generated and sent to the thermal head 4.

The gradation count circuit 65 receives the strobe completion signal from the strobe generation circuit 67 to count up the gradation.

Upon receiving the gradation count of the gradation count circuit 65, the strobe generation circuit 67 outputs a strobe pulse having a pulse width suitable to each gradation.

When up to predetermined gradation has been printed in the same way, the supply of the one-line printing signal to the latch signal gate circuit 64 is stopped and the gate is closed.

Here, the next latch signal is not outputted and one line printing is finished.

More detailed operation of the circuit shown in FIG. 14 will now be described by referring to FIG. 15.

Figure 15:
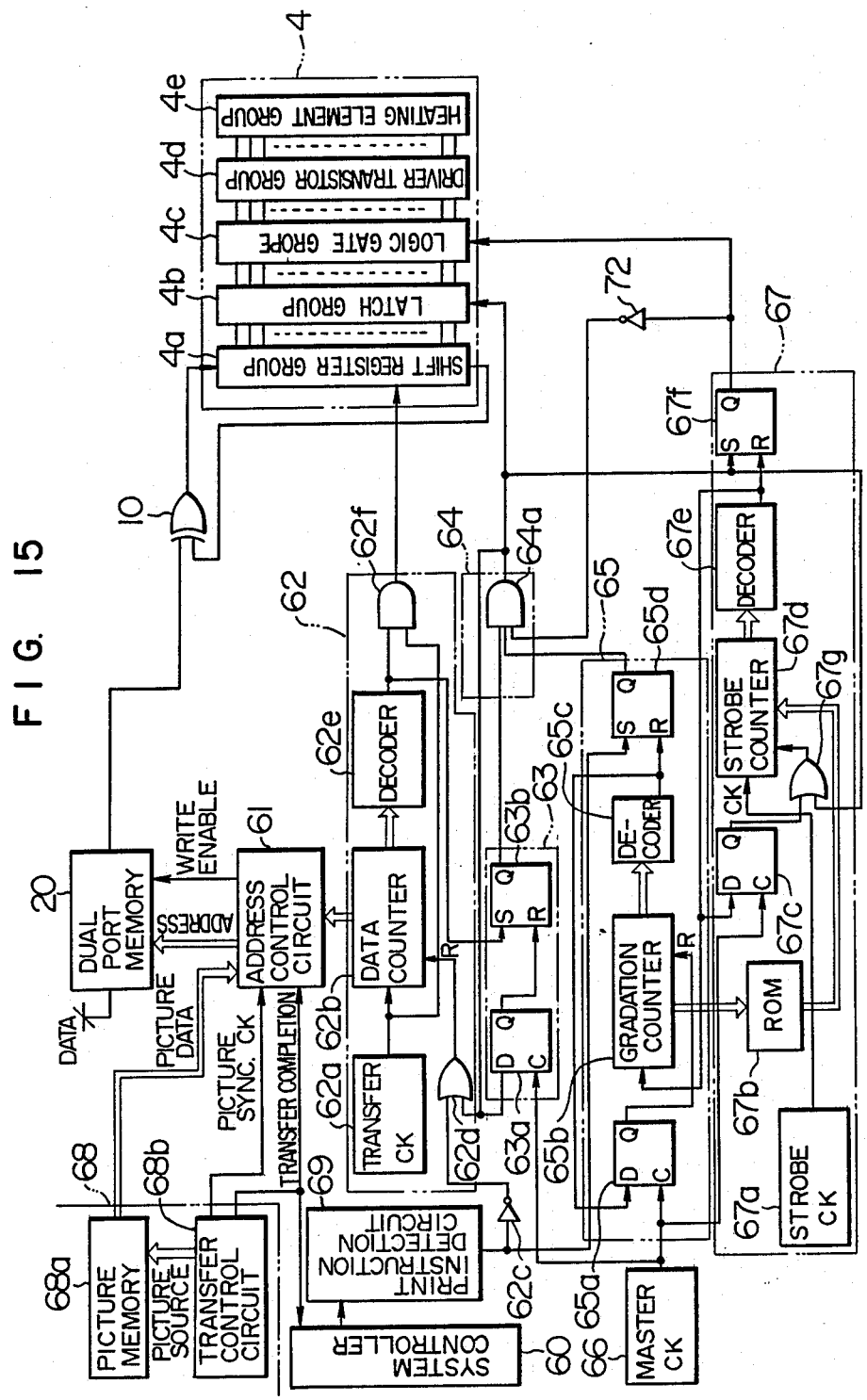

In FIG. 15, 68a denotes a picture memory, 68b a transfer control circuit, 62a a transfer CK generation circuit, 62b a data counter, 62c an inverter, 62d an OR gate, 62e a decoder, 62f an AND gate, 63a a D-flip-flop (hereafter abbreviated as DFF), 63b an SR latch, 64a a three-input AND gate, 65a a DFF, 65b a gradation counter, 65c a decoder, 65d an SR latch, 67a a strobe CK generation circuit, 67b a ROM, 67c a DFF, 67d a strobe counter, 67e a decoder, 67f an SR latch, 4a a shift register group, 4b a latch group, 4c a logic gate group, 4d a driver transistor group, and 4e a heating element group.

In FIG. 15, the same symbols as those of FIG. 14 denote identical functions.

The operation will now be described.

First of all, the transfer control circuit 68b sends a picture data transfer control signal to the picture memory 68a. The picture memory 68a receives the picture data transfer control signal and sends data of one line of a screen among the digital picture data to the address control circuit 61.

The transfer control circuit 68b sends a picture synchronization CK synchronized to the picture data to the address control circuit 61.

The address control circuit 61 sends the picture data supplied from the picture memory 68a to the dual port memory 20 as the address and simultaneously sends a write enable signal to the dual port memory 20 in synchronism with the picture synchronization CK. By this operation, digital picture data are memorized in the dual port memory 20 as head ON/OFF data.

When data corresponding to one line of the picture have been transferred to the dual port memory 20, the transfer control circuit 68b sends the transfer completion signal to the address control circuit 61 and the system controller 60.

The system controller 60 sends a print start signal to the print instruction detection circuit 69.

The print instruction detection circuit 69 detects the print start signal supplied from the system controller 60 and removes the reset of the data counter via the inverter 62 and the OR gate 62d.

At the same time, the print instruction detection signal is supplied to a terminal S of the SR latch 65d to change the output of the SR latch 65d to "1". As a result, one input of the three-input AND gate becomes "1". Although not illustrated, the counters, SR latches and DFFs are initially reset.

Since the data counter 62b is supplied with transfer CKs from the transfer CK generation circuit 62a, the data counter 62b begins to count the transfer CKs when the reset of the data counter 62b is removed.

The data counter 62b sends the count to the dual port memory 20 via the address control circuit 61.

The dual pert memory 20 first sends head ON/OFF data of the 0-th gradation to the exclusive OR gate 10.

The shift register group 4a is reset before printing.

The exclusive OR gate 10 is supplied with the head ON/OFF signal from the dual port memory 20 and a datum "1" from the shift register group 4a, and sends their exclusive OR output to the shift register group 4a.

The shift register group 4a has N registers, and their respective internal states coincide with ON/OFF states obtained when heat is generated.

The transfer CK supplied from the transfer CK generation circuit 62a is sent to the shift register group 4a via the AND gate 62f as the shift CK of the head data. Upon the arrival of the transfer CK, the shift register group 4a takes the head data into the inside thereof.

The data counter 62b sends its count to the address control circuit 61 and simultaneously to the decoder 62e.

The decoder 62e detects that the count in the data counter has reached N and sends an N data transfer completion signal ("0") to the AND gate 62f. Since the AND gate 62f is thus closed, the transfer CK supplied from the transfer CK generation circuit 62a is stopped.

The decoder 62e sends the N data transfer completion signal to the SR latch 63b. The SR latch 63b inverts its internal state to change its Q output to "H". The latch source signal is thus sent to the three-input AND gate 64a.

Since the Q output of the SR latch 65d is "1" and the Q output of the SR latch 67f is "0", the three-input AND gate 64a outputs "1".

The three-input AND gate 64a sends the latch signal to the latch group 4b to take the head ON/OFF data of the 0-th gradation stored in the shift register group 4a into the latch group 4b.

The three-input AND gate 64a sends a latch signal "1" to the DFF 63a and the reset terminal of the data counter 62b via the OR gate 62d.

The CK input of the DFF 63a is supplied with a master CK from the master CK generation circuit 66. The latch signal is taken in by the master CK and outputted with a delay corresponding to one CK. The DFF 63a sends the delayed latch signal to an R input of the SR latch 63b. The SR latch 63b inverts its internal state to "0". By the above described operation, the three-input AND gate 64a outputs a latch signal corresponding to the pulse width of the master CK.

Here the latch signal is simultaneously sent to the SR latch 67f and to a load input of the strobe counter 67d via the OR gate 67g. The SR latch 67f inverts its internal state to "1" and sends it to the logic gate group 4c and to the three-input AND gate 64a via an inverter.

The logic gate group 4c is supplied with a strobe signal of "1" from the SR latch 63b and opens gates to send the head ON/OFF data of the 0-th gradation stored in the latch group 4b to the heating element group 4e via the driver transistor group 4d. As a result, heat is generated by respective heating elements.

At tis time, the gradation counter 65b indicates the value of "0" and sends that value (gradation 25 count) to the ROM 67b. (For each gradation, conduction time data suitable to the gradation are inputted into the ROM 67b as 2's complement beforehand.)

The ROM 67b sends the conduction time data of the 0-th gradation to the strobe counter 67d.

The strobe counter 67d loads the conduction time data of the 0-th gradation therein by the latch signal supplied from the three-input AND gate 64a.

The strobe counter 68d begins to count strobe CKs inputted from the strobe CK generation circuit 67a on the basis of the load value of the 0-th gradation and sends the count to the decoder 67e.

When the count of the strobe counter 67 has reached a predetermined value, the decoder 67e sends the strobe count completion signal to the R input of the SR latch 67f, the D input terminal of the DFF 67c and the CK input terminal of the gradation counter 65b. The gradation counter 65b increases the count by unity to indicate the 1st gradation.

The ROM 67b receives the count of the 1st gradation and sends the conduction time data suitable to the 1st gradation to the strobe counter 67d.

The DFF 67c receives the strobe count completion signal from the decoder 67e. The DFF 67c delays the master CK by the pulse width of the master CK and supplies it to the load terminal of the strobe counter 67d via the OR gate 67g to load the conduction time data of the 1st gradation into the strobe counter 67d.

The SR latch 67f is supplied at R with the strobe count completion signal from the decoder 67e and inverts its internal state to "0". The SR latch 68f sends the internal state to the logic gate group 4c, and closes gates to stop the heat generation of the heating element group 4d.

The SR latch 67f sends a strobe signal of "0" to the three-input AND gate 64a via an inverter.

The three-input AND gate 64a opens the gate. If transfer of the head ON/OFF data has been finished before the termination of the strobe pulse, the Q output of the SR latch 63b becomes "1" and the three-input AND gate 64a outputs the latch signal again.

The latch signal resets the data counter again via the OR gate 62d to start the data transfer of the next gradation and its data count again.

Further, the latch signal is supplied to the SR latch 67f and simultaneously to the load terminal of the strobe counter 67d via the OR gate 67g. The strobe counter 67d starts counting.

As described above, the head ON/OFF data, the latch signal and the strobe are sen to the thermal line head 4 for each gradation. From the 0-th gradation, printing is performed every gradation. When the gradation counter 65b has reached a predetermined gradation, the decoder 65c sends a predetermined gradation completion signal to the D input terminal of the DFF 65a and the R input terminal of the SR latch 65d.

The SR latch 65d inverts its internal state to "0" and sends it to the three-input AND gate 64a.

Since one input of the three-input AND gate 64a (i.e., the Q output of the SR latch 65d) becomes "0", the next latch pulse is not outputted even if the transfer of the head ON/OFF data and the strobe are finished.

By the above described series of operation, one line is printed. The gradation count circuit 65 and the strobe generation circuit 67 shown in FIG. 14 may be replaced by a microcomputer 70. The internal operation (flow) of the microcomputer 70 in that case will now be described by referring to FIG. 16.

Figure 16:
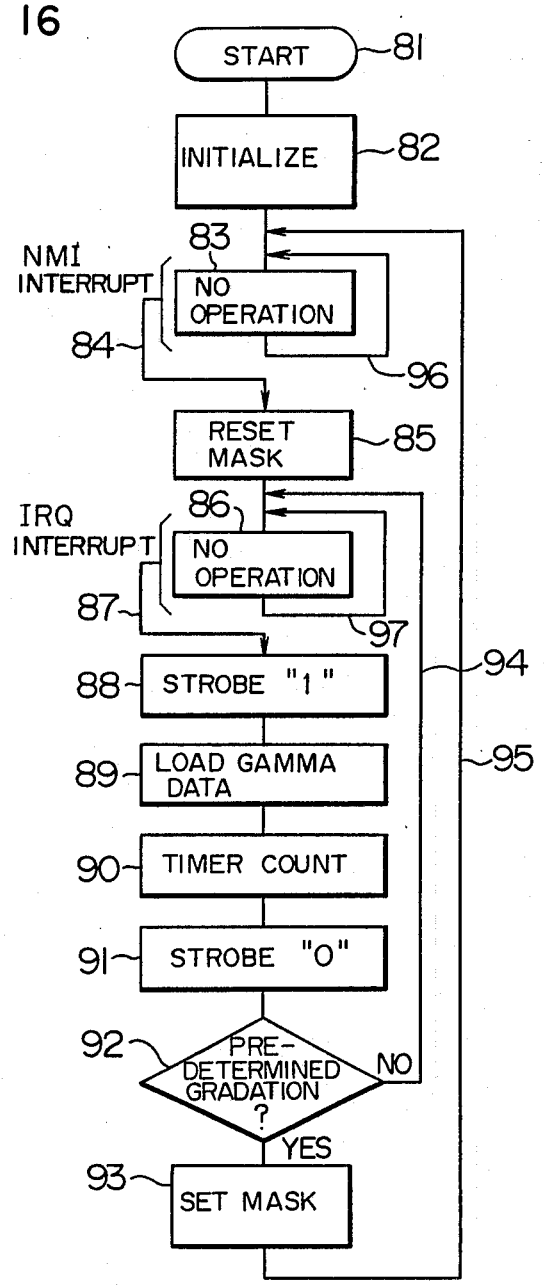
FIG. 16 is a flow chart of a microcomputer.

In FIG. 16, step 82 denotes an initialization routine, 83 NO operation, 84 nonmaskable interrupt (hereafter abbreviated as NMI), 85 mask reset, 86 NO operation, 87 an interrupt request (hereafter abbreviated as IRQ interrupt), 88 strobe "1" processing, 89 gamma data load, 90 timer count processing, 91 strobe "0" processing, 92 predetermined gradation judgment, and 93 mask set.

Immediately after the closing of the power supply of the set, the output port and the like are initialized. At this time, the strobe outputted from the microcomputer is set to "0" (OFF). Then the program proceeds to the NO operation step 83. From the NO operation step 83, the program returns to the NO operation step 83 via a step 96. So long as an interrupt or reset is not inputted, the program continues to circulate through a routine comprising the NO operation step 83 and the step 96.

Succeedingly, the print instruction detection signal is taken in as the NMI interrupt. The program gets out of the routine comprising the NO operation step 83 and the step 96, and resets the mask of the IRQ interrupt at the mask reset step 85.

Then the program jumps to the NO operation step 86, and continues to circulate through a routine comprising the NO operation step 86 and the step 97.

Here the latch signal is taken in as the IRQ interrupt. The program gets out of the routine comprising the NO operation step 86 and the step 97 and jumps to the strobe "1" processing step 88 to change the strobe signal to "1" (ON). At the gamma data load step 89, the conduction time data of the 0-th gradation are read out from a ROM within the microcomputer and loaded into an output compare register of hard ware timer.

At the timer count step 90, the hard timer is reset, and counting is started. When the count of the hardware timer coincides with the value of the conduction time data stored in the output compare register, the program proceeds to the strobe "0" processing step 91 and changes the strobe to "0" (OFF). At this time, the contents of the gradation count register within the microcomputer is increased by one.

It is then judged at the predetermined gradation judgment step 92 whether the predetermined gradation has been reached or not. Since the gradation count register within the microcomputer indicates the 1st gradation, the program jumps to the NO operation step 86 through a step 94.

Here, printing of the 0-th gradation has been completed.

When the predetermined gradation has been reached other repetition of similar operation, the program jumps from the predetermined gradation judgment step 92 to the mask set step 93 to perform the mask of the IRQ interrupt.

Then the program returns to the routine comprising the NO operation step 83 and the step 96 through a step 95.

By the operation heretofore described, the microcomputer outputs a strobe pulse of one line.

The input of the print instruction detection signal is represented as the NMI interrupt. However, the I/O port may be used instead and the portion of the NO operation step 83 may be replaced by input judgment of the print instruction detection signal.

Further, the input of the latch signal is represented by the IRQ interrupt. However, the NO operation step 86 may be used for the input judgment of the latch signal.

Further, the hardware timer in the microcomputer is used for making the strobe pulse width. Instead, contents of a register may be increased one by one so that it may be judged whether the conduction time data stored in the ROM has been reached or not.

Another embodiment of the present invention will now be described by referring to FIG. 17.

In the present embodiment, the ROM 67b of FIG. 15 is replaced by a RAM. Conduction time data suitable to the temperature of the head substrate in printing are stored in the RAM for each printing, and values of the data are loaded into the strobe counter 67d.

Before description of the operation, a concept of making data of an arbitrary temperature on the basis of data of a reference temperature will now be described.

In case of a printer using a thermal head, the density becomes larger than a predetermined density when the temperature of the head substrate is high even if the conduction time is identical. When the temperature of the head substrate is low, the density becomes smaller than the predetermined density.

Figure 18:
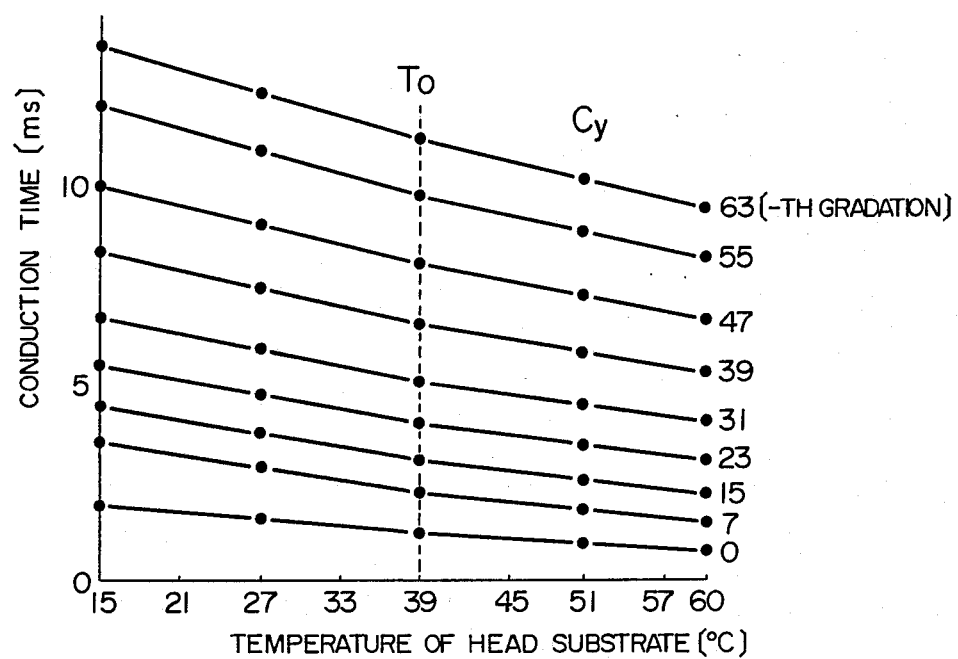
FIG. 18 is a conduction time-density characteristics diagram.

When the temperature of the head substrate is high, therefore, the conduction time must be made shorter. When the temperature of the head substrate is low, the conduction time must be made longer. The experimentally obtained conduction time values for obtaining an identical density are shown in FIG. 18.

By using a datum at a reference temperature as the reference, the conduction time at an arbitrary temperature can be expressed by the following expressions.

$$t_1 = t_0 - (T_0 - T_1) \times a_x \text{ (when the temperature is lower than the reference temperature)}$$

$$t_2 = t_0 + (T_0 - T_1) \times b_x \text{ (when the temperature is higher than the reference temperature)}$$

where
$t_1$: Conduction time at a temperature lower than the reference temperature
$t_0$: Conduction time at a reference temperature
$t_2$: Conduction time at a temperature higher than the reference temperature
$T_0$: Reference temperature
$T_1$: Temperature of head substrate
$a_x$: Coefficient of the x-th gradation at a temperature lower than the reference temperature
$b_x$: Coefficient of the x-th gradation at a temperature higher than the reference temperature On the basis of the conduction time of each gradation at a reference temperature and the coefficient, the conduction time at a arbitrary temperature can be derived.

Figure 17:
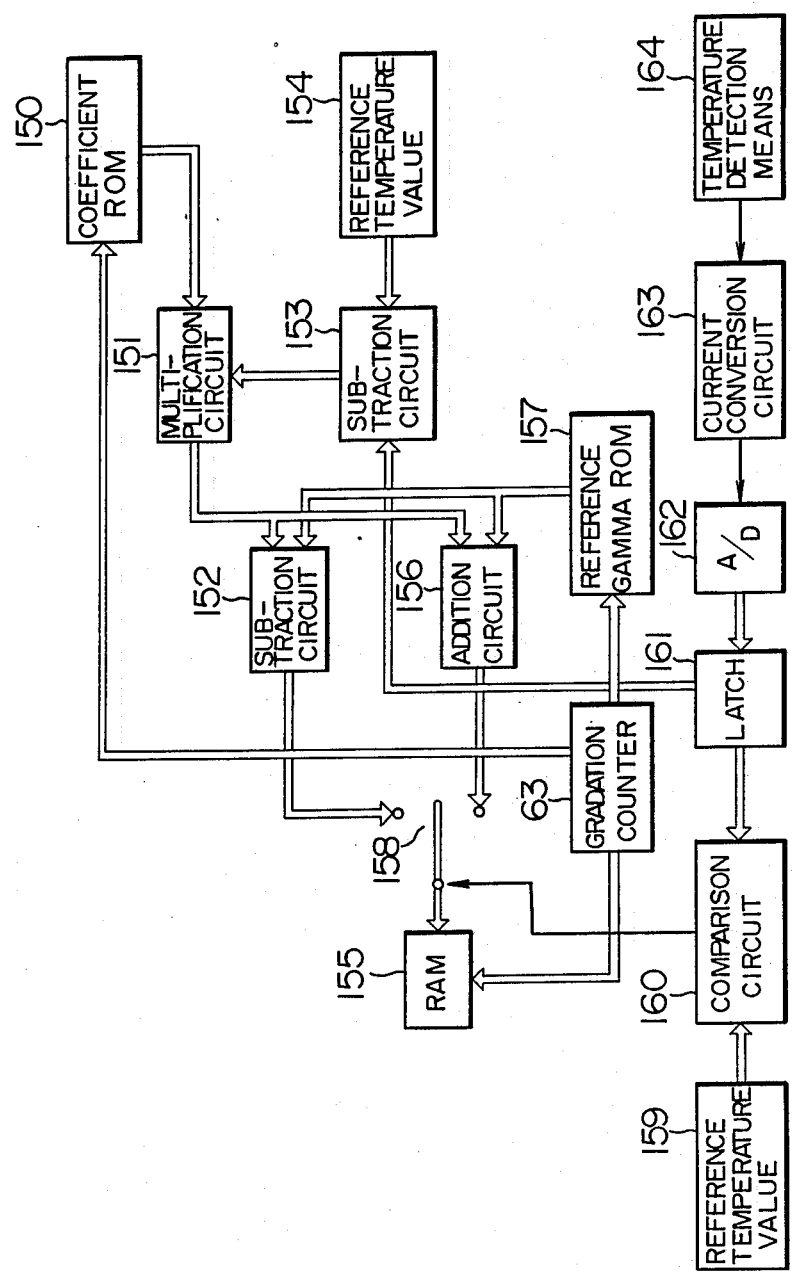
FIG. 17 is a circuit diagram showing another embodiment of the present invention.

The configuration of a circuit for deriving the conduction time at an arbitrary temperature is shown in FIG. 17.

In FIG. 17, numeral 150 denotes a coefficient ROM, 151 a multiplication circuit, 152 a subtraction circuit, 153 a subtraction circuit, 154 a reference temperature value generation circuit, 155 a RAM, 156 an addition circuit, 157 a reference gamma ROM, 158 a temperature gamma selector, 159 a reference temperature value generation circuit, 160 a comparison circuit, 161 a latch, 162 an A/D converter, 163 a current conversion circuit, and 164 temperature detection means. Numeral 63 denotes a gradation counter, which has the same function as that of the gradation counter shown in FIG. 15.

The operation will now be described.

Immediately before printing one sheet, the temperature detection means 164 detects the temperature of the substrate of the thermal line head and transfers it to the current conversion circuit 163.

The current conversion circuit 163 converts a detected temperature signal supplied from the temperature detection means 164 into a current and transfers it to the A/D converter 162. The A/D converter 162 converts an analog temperature signal to a digital temperature signal and sends the digital temperature signal to the latch 161 to store it therein temporarily.

On the basis of the gradation count supplied from the gradation counter, the coefficient ROM 150 sends a coefficient suitable to that gradation to the multiplication circuit 151.

On the other hand, the subtraction circuit 153 subtracts the temperature value obtained immediately before printing of one sheet and stored in the latch 161 from the reference temperature value of the reference temperature value generation circuit 154 and sends the difference to the multiplication circuit 151.

The multiplication circuit 151 multiplies a coefficient suitable to the gradation supplied from the coefficient ROM 150 with the difference supplied from the subtraction circuit 153 and sends the resultant product to the subtraction circuit 152 and the addition circuit 156.

The reference gamma ROM 157 receives the gradation count from the gradation counter 63 and sends the conduction time data of that gradation to the subtraction circuit 152 and the addition circuit 156.

The subtraction circuit 152 subtracts the product value supplied from the multiplication circuit 151 from the reference conduction time data supplied from the reference gamma ROM 157 and sends the resultant difference to the selector 158.

The addition circuit 156 adds the reference conduction time data supplied from the reference gamma ROM 157 to the product value supplied from the multiplication circuit 151 and sends the resultant sum to the selector 158.

The comparison circuit 160 compares the temperature data obtained immediately before printing of one sheet and stored in the latch 161 with a reference temperature value supplied from the reference temperature value generation circuit 159 and sends the resultant signal of comparison to a select input of the selector 158.

When the temperature obtained immediately before printing of one sheet is higher than the reference temperature, the selector 158 selects the sum supplied from the addition circuit 156. When the temperature obtained immediately before printing of one sheet is lower than the reference temperature, the selector 158 selects the difference supplied from the subtraction circuit 152 and sends it to the RAM 155.

By using the gradation count supplied from the gradation counter 63 as the address, the RAM 155 takes the computed value supplied from the selector 158 into the inside thereof as data.

In the present embodiment, it is not necessary to memorize the conduction time in the ROM for each temperature. Instead, the conduction time data at the reference temperature and coefficients of each gradation are memorized in the ROM. Thereby it is possible to input the conduction time at each temperature into the RAM and read it therefrom. It is thus possible to largely reduce the capacity of the ROM.

Even if a microcomputer is used to output the conduction time at an arbitrary temperature instead of the circuit shown in FIG. 17, a similar result is obtained.

Figure 20:
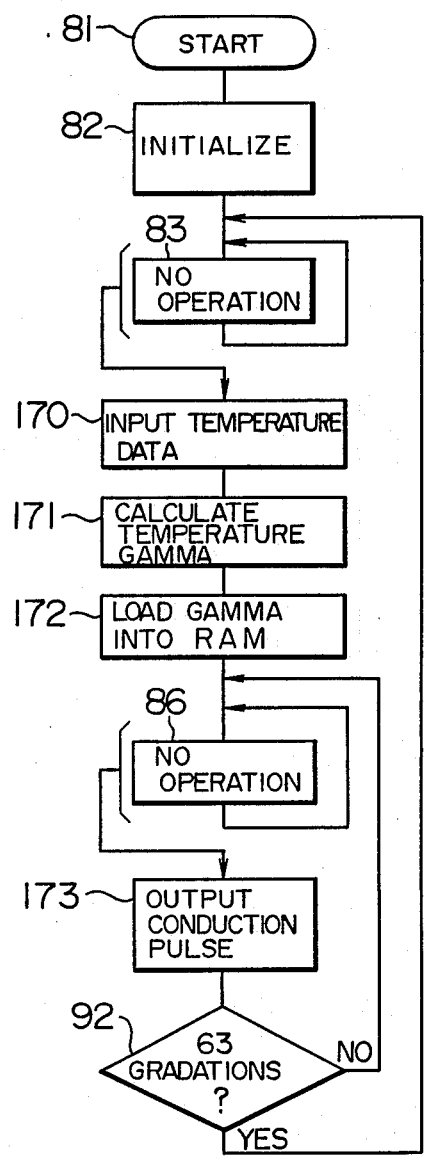
FIG. 20 is a flow chart of the embodiment shown in FIG. 19.

FIG. 20 shows a flow chart of a microcomputer including the processing for calculating the conduction time and storing the result into the RAM.

In FIG. 20, numeral 170 denotes a temperature data input step, 171 a temperature gamma calculation step, 172 load processing to the RAM, and 173 a conduction pulse output routine.

In FIG. 20, the same symbols as those of FIG. 16 represent identical functions.

In operation, the print instruction detection signal is inputted at the routine 83 of NO operation. The temperature data are inputted at step 170, and the temperature gamma is calculated at step 171. And the load processing to the RAM is performed at step 172.

The remaining operation performed in the microcomputer is the same as that described by referring to FIG. 16.

Figure 19:
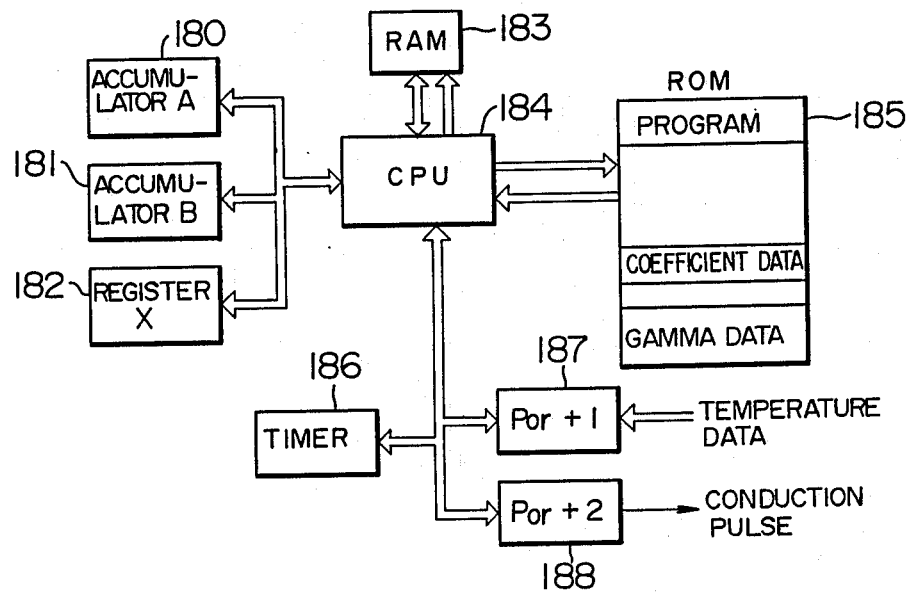
FIG. 19 is a block diagram showing another embodiment of the present invention.

FIG. 19 shows the internal configuration of the microcomputer.

In FIG. 19, numeral 185 denotes a ROM. In the ROM 185, the program, coefficient data and gamma data are stored beforehand.

In FIG. 20, the temperature data input step 170, the temperature gamma calculation step 171 and the RAM loading step 172 may also be placed before the NO operation step 83.

Figure 21:
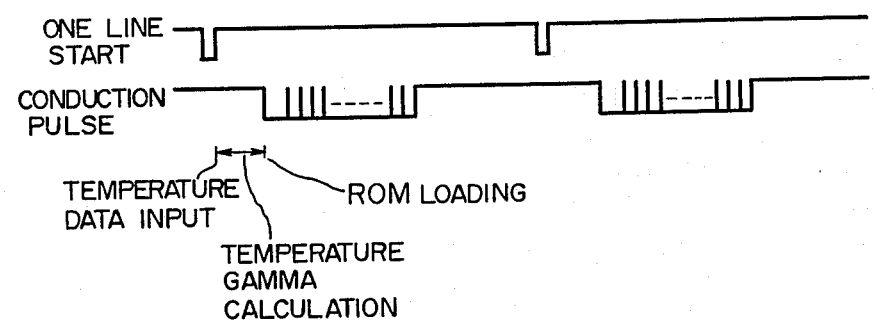
FIG. 21 is a timing chart of the embodiment shown in FIG. 19.

The timing chart for calculating the conduction time at an arbitrary temperature in the microcomputer is shown in FIG. 21.

Another embodiment of the present invention will now be described by referring to FIG. 22.

When ink paper or printing paper having different color generating properties is used, the present invention generates conduction time suited to the property.

Figure 22:
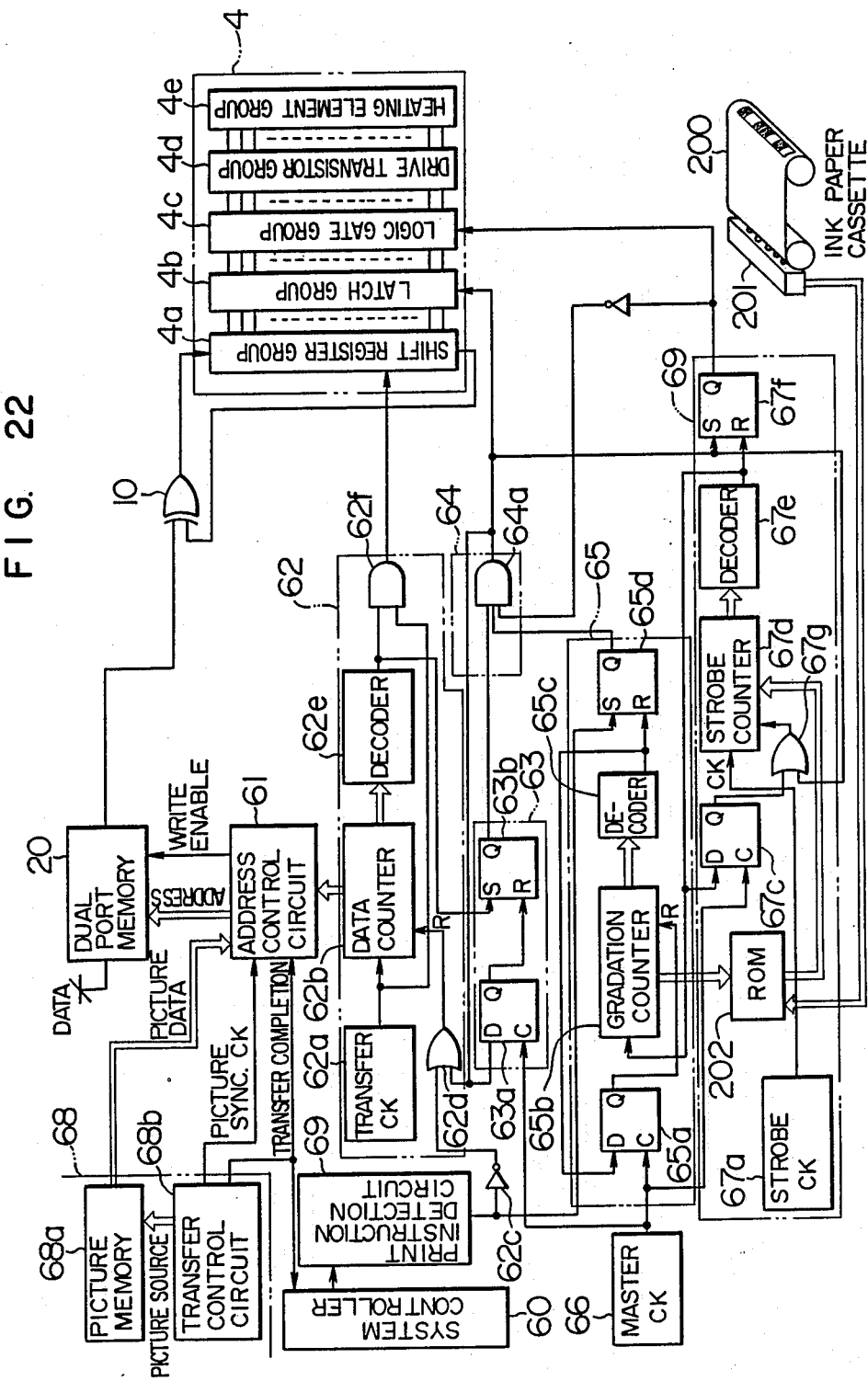
FIGS. 22 to 25 are circuit diagrams of other embodiments.

In FIG. 22, numeral 200 denotes an ink paper cassette, 201 a photosensor, and 202 a ROM having conduction time data suited to a plurality of ink paper properties stored beforehand therein.

In FIG. 22, the same symbols as those of FIG. 15 denote identical functions.

In the ink paper cassette 200, a code indicating the property of the ink paper is recorded beforehand. When the ink paper cassette is inserted, the photosensor 201 senses the property code and supplies the address to the ROM 202.

When a picture is printed the ROM 202 outputs conduction time data suited to the property of ink paper and sends the conduction time data to the strobe counter 67d.

The operation of the remaining circuits is the same as that of FIG. 15.

In the present embodiment, prints having an identical density can be always, obtained automatically for respective sheets of ink paper.

In FIG. 22, the code indicating the property of ink paper and printing paper may be concavo-convex type. And the code may be sensed mechanically or may be sensed magnetically.

Even in a monochrome print, information on the ink paper or printing paper may be read out and may be sent to the ROM address to changeover the ROM data.

Another embodiment of the present invention will now be described by referring to FIG. 23.

In the present embodiment, the ROM 202 of FIG. 22 is divided into a plurality of ROMs. On the basis of information of the ink paper cassette, data from a ROM are so selected by a selector that prints of identical density may always be obtained irrespective of the color generating density properties of the ink paper and printing paper.

Figure 23:
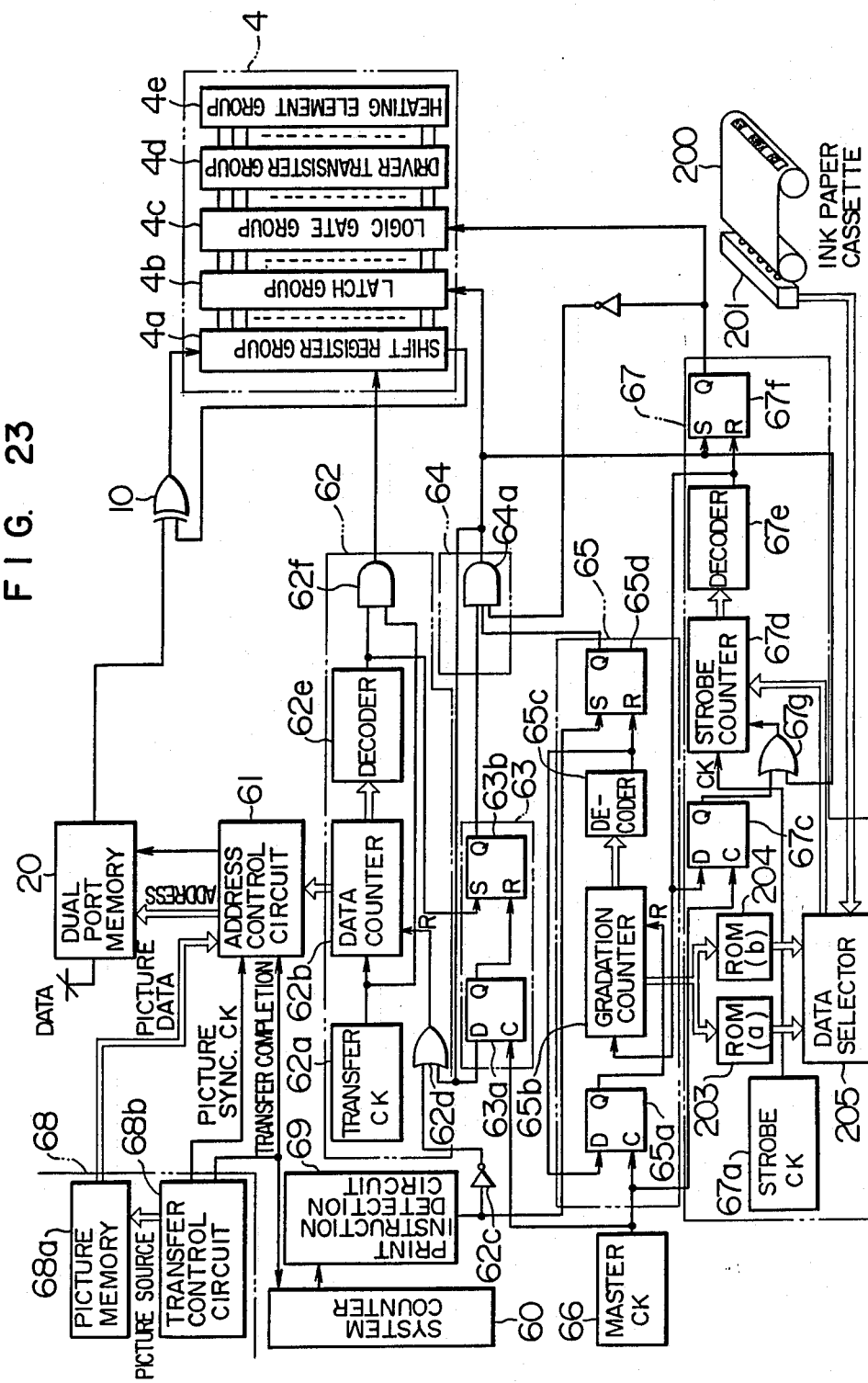

In FIG. 23, numerals 203 and 204 denote ROMs for storing therein conduction time data corresponding to different ink paper and printing paper, and numeral 205 denotes a data selector.

During the printing operation, the ROM(a) 203 and the ROM(b) 204 always outputs conduction time data and sends the data to the data selector 205. On the basis of the information of the ink paper cassette, the data selector 205 selects data out of data supplied from respective ROMs and sends the selected data to the strobe counter 67d to generate a strobe.

In FIG. 23, two ROMs are shown. When there are a plurality of properties of the ink paper cassette and printing paper, however, a plurality of ROMs are used.

The ink paper/printing paper information may be recorded only on the printing paper or may be recorded on both the printing paper and ink paper.

Even in monochrome printing, monochrome ROMs may be provided and their outputs may be selected by a selector in the same way.

Another embodiment of the present invention will now be described by referring to FIG. 24.

In the present embodiment, a ROM memorizes conduction time data of reference ink paper/printing paper, and another ROM memorizes the difference between the reference conduction time and the conduction time suited to the color generation property of replaced ink paper/printing paper. Depending upon change of ink paper/printing paper, an error datum is added to or subtracted from the reference conduction time datum to derive a conduction time datum suited to the color generation property of the ink paper/printing paper after change. A strobe pulse width is thus generated.

Figure 24:
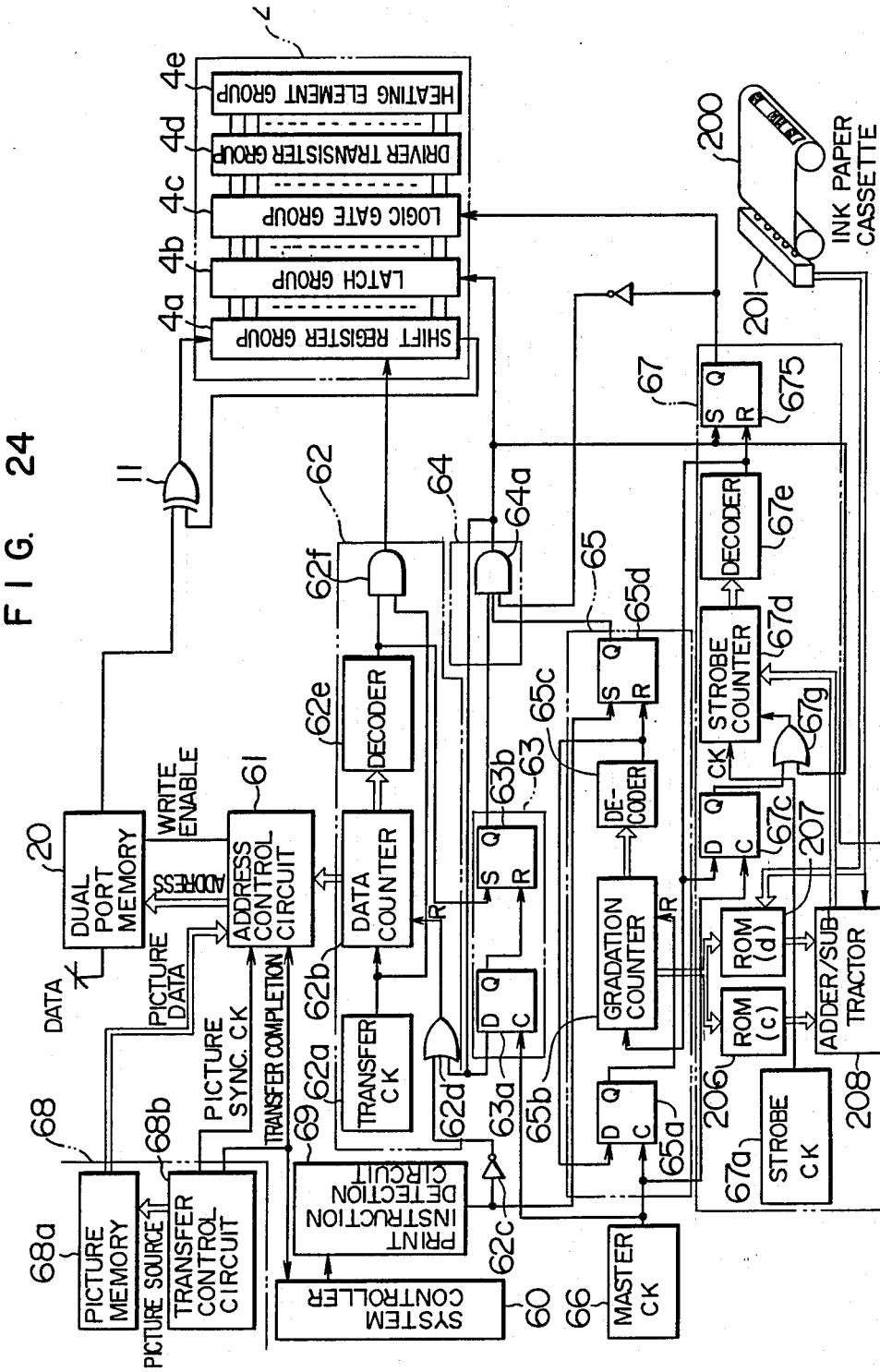

In FIG. 24, numeral 206 denotes a reference data ROM(c), 207 an error data ROM(d) and 208 an adder/subtracter.

In FIG. 24, the same symbols as those of FIG. 22 represent identical functions.

In operation, the photosensor 201 sends ink paper property information to the error data ROM(d) as an address.

The reference conduction time data stored in the ROM(c) 206 and the error conduction time data stored in the ROM(d) 207 are sent to the adder/subtracter 208. The adder/subtracter 208 performs calculation on the reference data and the error data and sends the result to the strobe counter 69. The remaining operation is the same as that of FIG. 15.

In FIG. 24, the ROM(c) 206 and the ROM(d) 207 may be integrated into a single ROM.

In the present embodiment, only errors of the conduction time of the ink paper cassette need be stored in the ROM. Therefore, it is possible to deal with a large number of kinds of ink paper/printing paper by using a small ROM capacity.

Another embodiment of the present invention will now be described by referring to FIG. 25.

In the present embodiment, data indicating the conduction time are memorized in the ink paper cassette and printing paper. The data are temporarily transferred to the RAM before printing and are read out from the RAM in printing to perform conduction suited to the color generation property of the ink paper.

Figure 25:
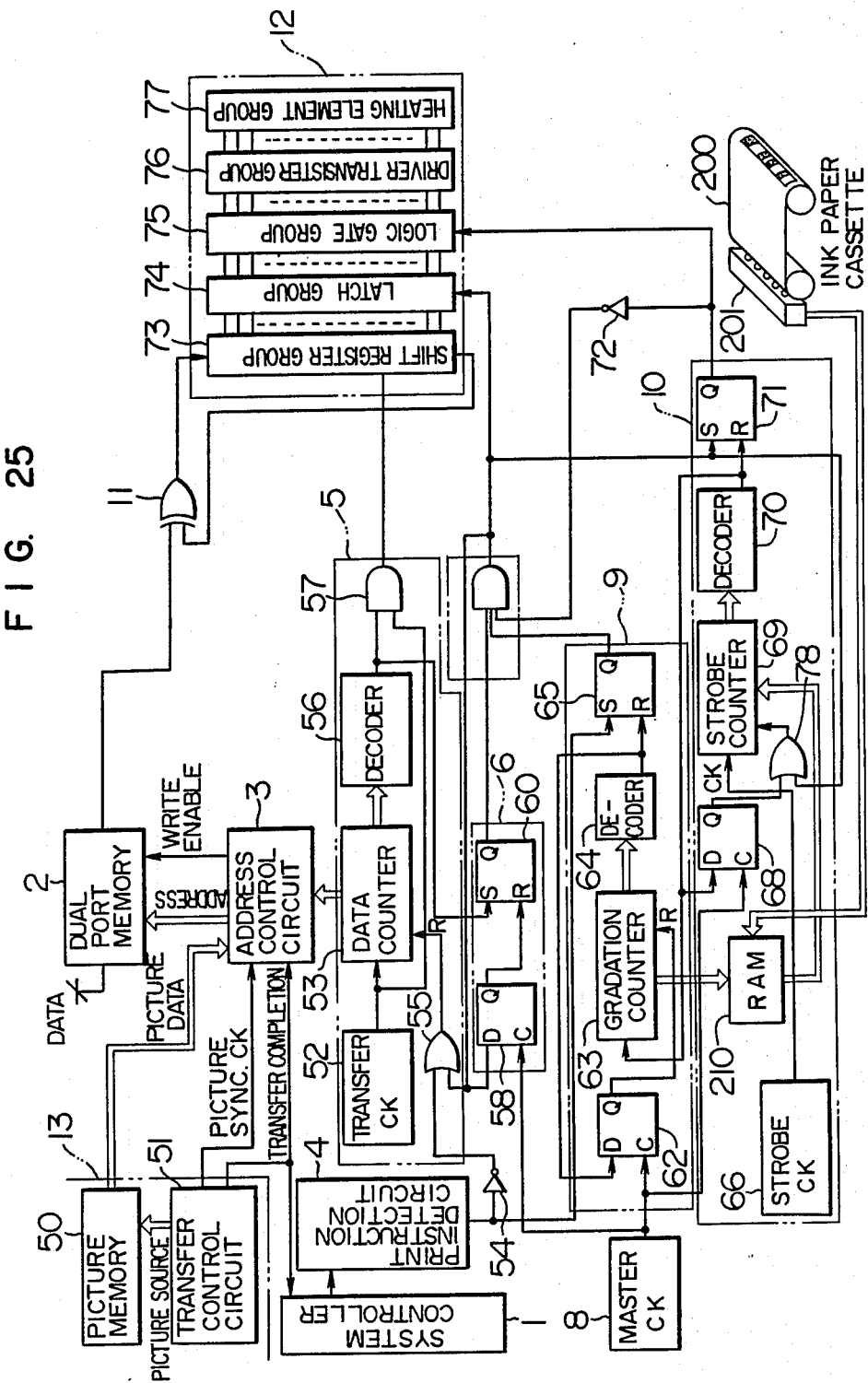

In FIG. 25, numeral 210 denotes a RAM, 200 an ink paper cassette, and 201 a photosenser.

In FIG. 25, the same symbols as those of FIG. 24 represent identical functions.

The operation of the circuit shown in FIG. 25 will now be described.

Data indicating the conduction time are recorded on an ink paper cassette or printing paper to be inserted into a printer.

Before printing, the conduction time data recorded on an ink paper cassette or printing paper are transferred from the photosensor 201 to the RAM 210 and stored therein.

In the same way as the operation of the ROM 67 of FIG. 24, the previously stored conduction time data are transferred in the printing operation to the strobe counter 69 by using the gradation data supplied from the gradation counter 63 as the address.

The remaining operation of FIG. 25 is the same as that of FIG. 24.

By using the present embodiment, it is possible to associate the conduction time with any ink paper/printing paper without providing data defining the conduction time within the thermal head drive circuit.

The present invention provides a video printer capable of transferring data to the line memory more rapidly and capable of printing a picture at a high speed.

We claim:

1. In a video printer including a picture data input terminal successively supplied with digital picture data corresponding to one line, a memory for storing therein picture data corresponding to one line, a shift register successively supplied with data read out from said memory, and a thermal head having a plurality of heating resistors coupled respectively to respective bits of said shift register,
   a video printer control circuit comprising:
   first address generation means for generating a first address of said memory on the basis of picture data supplied to said picture data input terminal and for supplying said first address to said memory, said memory being addressed by said first address and a second address;
   second address generation means for generating an address signal depending upon a printing dot of said thermal head and for supplying the address signal to said memory as said second address;
   a memory write circuit comprising said first address generation means and said second address generation means; and
   a memory readout circuit for generating said second address for each of said first address and for supplying said second address to said memory.

2. A video printer control circuit according to claim 1, wherein said memory write circuit outputs an address depending upon a gradation level of picture data as said first address, and said memory read circuit includes gate means coupled to output terminals of said memory and said shift register so as to apply exclusive OR operation to an output of said memory and a serial output of said shift register, a resultant exclusive OR output of said gate means being supplied to an input terminal of said shift register.

3. A video printer control circuit according to claim 1, wherein said memory write circuit includes a counter and comparison means for comparing an output of said counter with the gradation level of input picture data, and said memory write circuit outputs the output of said counter as said first address provided that the output of said counter does not exceed the gradation level of the input picture data.

4. A video printer control circuit according to claim 1, wherein said memory write circuit includes a counter and comparison means for comparing an output of said counter with the gradation level of input picture data, and said memory write circuit outputs the output of said counter as said first address provided that the output of said counter exceeds the gradation level of the input picture data.

5. A video printer control circuit according to claim 1, further comprising:
   a system controller for instructing conduction to said thermal head;
   a print instruction detection circuit coupled to said system controller;
   a data count circuit coupled to said print instruction detection circuit and said thermal head;
   a latch signal generation circuit coupled to said data count circuit;
   a latch signal gate circuit coupled to said latch signal generation circuit and said thermal head;
   a gradation count circuit coupled to said latch signal gate circuit and said print instruction detection circuit; and
   a strobe generation circuit coupled to said gradation count circuit, said latch signal gate circuit and said thermal head.

* * * * *